US010404354B2

(12) United States Patent
Tong et al.

(10) Patent No.: US 10,404,354 B2
(45) Date of Patent: Sep. 3, 2019

(54) METHODS AND SYSTEMS FOR IMPROVING SPECTRUM UTILIZATION FOR SATELLITE COMMUNICATIONS

(71) Applicant: Asia Satellite Telecommunications Company Limited, Wanchai (HK)

(72) Inventors: Roger Shun Hong Tong, Tai Po Industrial Estate (HK); Fred Chun Yin Vong, Tai Po Industrial Estate (HK); Hai Hu, Tai Po Industrial Estate (HK); Harry Yin Chung Leung, Tai Po Industrial Estate (HK); Man Hei Chan, Tai Po Industrial Estate (HK); Kat Fan Yip, Tai Po Industrial Estate (HK)

(73) Assignee: Asia Satellite Telecommunications Company Limitted, Wanchai (HK)

( * ) Notice: Subject to any disclaimer, the term of this patent is extended or adjusted under 35 U.S.C. 154(b) by 135 days.

(21) Appl. No.: 15/411,680

(22) Filed: Jan. 20, 2017

(65) Prior Publication Data
US 2017/0135108 A1  May 11, 2017

Related U.S. Application Data

(62) Division of application No. 14/633,909, filed on Feb. 27, 2015, now Pat. No. 10,050,698.

(51) Int. Cl.
*H04B 7/185* (2006.01)
*H04B 1/00* (2006.01)
(Continued)

(52) U.S. Cl.
CPC ....... *H04B 7/18513* (2013.01); *H04B 1/0057* (2013.01); *H04B 7/18515* (2013.01);
(Continued)

(58) Field of Classification Search
CPC .. H04B 1/0458; H04B 7/0617; H04B 7/2041; H04B 7/18513; H04B 7/18515;
(Continued)

(56) References Cited

U.S. PATENT DOCUMENTS 6,317,583 B1  11/2001  Wolcott et al.
6,393,066 B1  5/2002  Moretti et al.
(Continued)

OTHER PUBLICATIONS

United States Patent and Trademark Office, "Restriction", issued in connection with U.S. Appl. No. 14/633,909, dated Nov. 10, 2016 (8 pages).

*Primary Examiner* — Harun Chowdhury
(74) *Attorney, Agent, or Firm* — Hanley Flight & Zimmerman, LLC

(57) ABSTRACT

Satellite communication methods and payloads are described. An imbalance in uplink and downlink availability may be mitigated through digitizing uplink spectrum, extracting guard band channels, and grouping the guard band channels to create a composite channel. The composite channel is converted to analog and RF up-converted, amplified, and multiplexed with other downlink analog channels before being transmitted to Earth. The guard bands may be from the same band of spectrum or different bands of spectrum, such as C band, Ka band, Ku band, etc. A satellite payload is described with dual output multiplexers having partially overlapping channels and a dual feed configuration. In one downlink implementation, unused regional band spectrum may be dynamically allocated to a spot beam. In one uplink implementation, regional band spectrum may be shared by a spot beam using spatial separation of the regional uplink location from the spot beam coverage area and digital cancellation techniques.

20 Claims, 18 Drawing Sheets

(51) Int. Cl.
*H04L 29/06* (2006.01)
*H04W 72/04* (2009.01)
*H01Q 1/28* (2006.01)
*H04B 7/204* (2006.01)

(52) U.S. Cl.
CPC ..... *H04B 7/18528* (2013.01); *H04B 7/18532* (2013.01); *H04L 69/22* (2013.01); *H04W 72/0426* (2013.01); *H04W 72/0453* (2013.01); *H01Q 1/288* (2013.01); *H04B 7/2041* (2013.01)

(58) Field of Classification Search
CPC ........... H04B 7/18528; H04B 7/18532; H04W 72/0453; H04W 72/0426; H04L 69/22
USPC ................ 370/316, 343, 480; 455/12.1, 3.02
See application file for complete search history.

(56) References Cited

U.S. PATENT DOCUMENTS

| | | | |
|---|---|---|---|
| 7,675,985 B1 | 3/2010 | Watson | |
| 7,925,208 B2 | 4/2011 | Sarraf et al. | |
| 2004/0092227 A1* | 5/2004 | Sarraf | H04B 7/2041 455/12.1 |
| 2004/0185775 A1 | 9/2004 | Bell et al. | |
| 2008/0311844 A1* | 12/2008 | Eidenschink | H04B 7/2041 455/3.02 |
| 2017/0041065 A1* | 2/2017 | Goettle, Jr. | H04B 1/0458 |

* cited by examiner

METHODS AND SYSTEMS FOR IMPROVING SPECTRUM UTILIZATION FOR SATELLITE COMMUNICATIONS

CROSS-REFERENCE TO RELATED APPLICATIONS

The present application is a divisional of U.S. patent application Ser. No. 14/633,909, filed Feb. 27, 2015, the contents of which are hereby incorporated by reference.

TECHNICAL FIELD

The present application relates to satellite communications, and more particularly to methods and systems for improving spectrum utilization in satellite communications.

BACKGROUND

Traditionally, satellite communications have involved a fixed routing of uplink analog channels to downlink analog channels. The input and output multiplexers and up/down converters are prearranged to implement the frequency plan for uplink and downlink.

A full digital solution is more flexible, but can be far more costly. Moreover, a digital payload with phased array antennas (beam steerable) uses solid state power amplifiers that achieve lower power output density than the comparable analog technology.

BRIEF DESCRIPTION OF THE DRAWINGS

Reference will now be made, by way of example, to the accompanying drawings which show example embodiments of the present disclosure, and in which.

Like reference numerals are used in the drawings to denote like elements and features.

DETAILED DESCRIPTION

Figure 1:
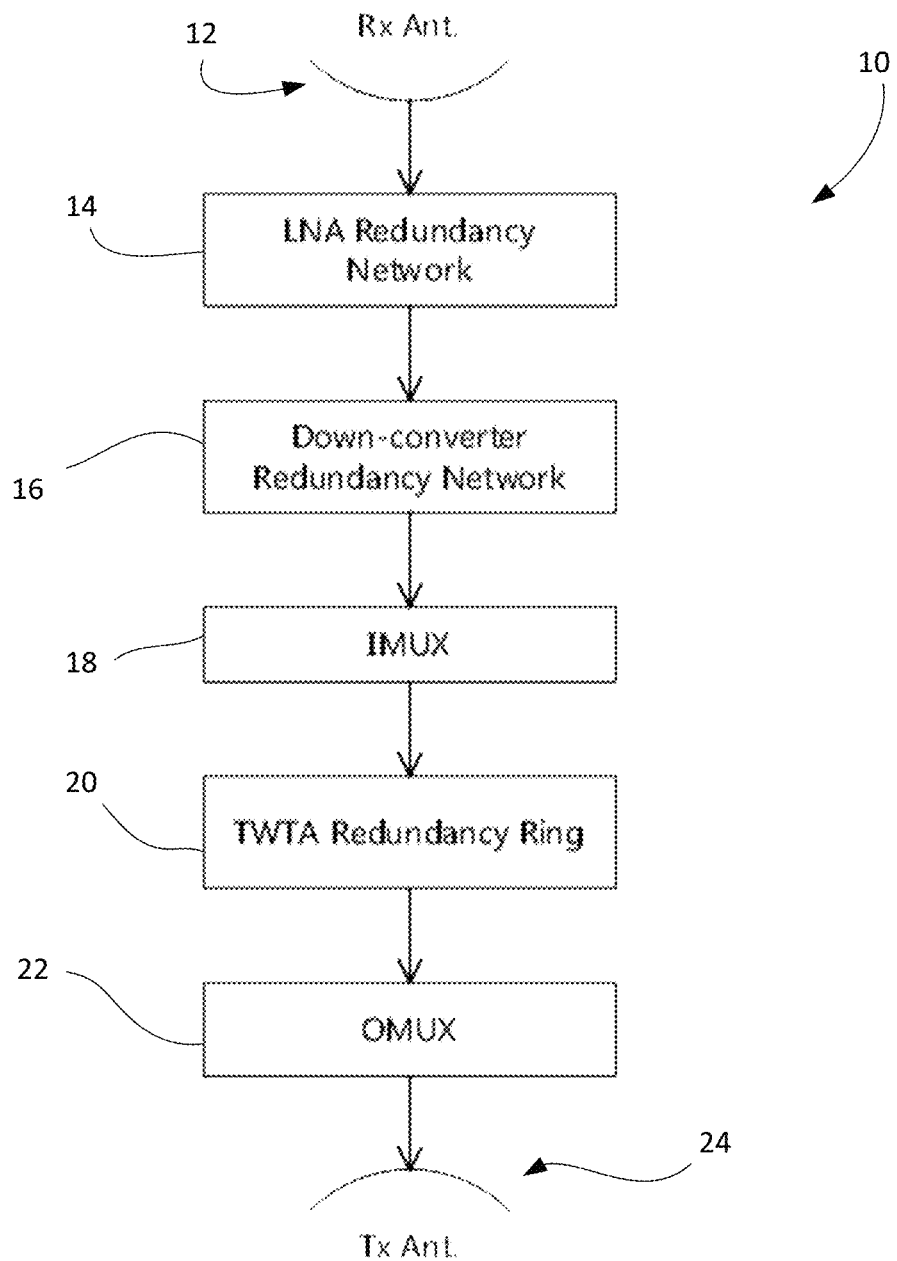
FIG. 1 is a block diagram of an example of a conventional analog satellite payload.

In one aspect, the present application describes a satellite payload for mitigating an imbalance in uplink and downlink availability for satellite communications. The payload includes a receive antenna and amplifiers to receive an uplink signal containing a plurality of channels in a band of spectrum at a satellite, each channel having a bandwidth and each pair of adjacent channels being separated by a guard band; an analog-to-digital converter to covert the band of spectrum to digital; a digital channelizer to channelize the digitized band of spectrum to obtain two or more digitized guard band channels each corresponding to a respective one of the guard bands and to group the two or more digitized guard band channels to create a composite channel; a digital-to-analog converter and an RF up-converter to convert the composite channel to an analog downlink channel; an output multiplexer to frequency division multiplex the analog downlink channel with other analog downlink channels; and a transmit antenna to transmit the multiplexed channels as an analog downlink signal.

In another aspect, the present application describes a method for mitigating an imbalance in uplink and downlink availability for satellite communications. The method includes receiving an uplink signal containing a plurality of channels in a band of spectrum at a satellite, each channel having a bandwidth and each pair of adjacent channels being separated by a guard band; digitally channelizing the band of spectrum to obtain two or more digitized guard band channels each corresponding to a respective one of the guard bands; grouping the two or more digitized guard band channels to create a composite channel; and converting the composite channel to an analog downlink channel, frequency division multiplexing the analog downlink channel with other analog downlink channels, and transmitting the multiplexed channels as an analog downlink signal.

In a further aspect, the present application describes a satellite payload for satellite communications. The payload includes a receive antenna and amplifiers to receive an uplink signal containing a plurality of channels in a band of spectrum at a satellite; an analog-to-digital converter to covert the band of spectrum to digital; a digital channelizer to channelize the digitized band of spectrum to route each of the plurality of channels to a respective downlink channel in a first frequency plan, and to form at least one additional downlink channel; a digital-to-analog converter and an RF up-converter; a first output multiplexer to frequency division multiplex the respective downlink channels in accordance with the first frequency plan, wherein the first frequency plan defines a guard band between each adjacent downlink channel in the first frequency plan; a second output multiplexer to frequency divisional multiplex the at least one additional downlink channel in accordance with a second frequency plan, wherein the second frequency plan defines one or more supplemental downlink channels covering the one or more of the guard bands; and one or more transmit antenna feeds to transmit the multiplexed signals.

In yet a further aspect, the present application describes a satellite payload for satellite communications. The payload includes a regional beam antenna operable over a regional band of spectrum; a narrowband spot beam antenna operable over a spot beam band of spectrum and a portion of the regional band of spectrum; a digital channelizer to route digitized spot beam channels to downlink channels, and wherein the digital channelizer is to dynamically assign one or more digitized spot beam channels to a part of the portion of the regional band of spectrum; a digital-to-analog converter to convert the digitized spot beam channels to analog; an RF up-converter to up-convert the analog spot beam channels; and a spot beam spectrum amplifier to amplify the up-converted analog spot beam channels in the spot beam band of spectrum and the portion of the regional band of spectrum.

In another aspect, the present application describes a satellite payload for satellite communications to share uplink capacity. The payload includes a spot beam antenna operable over a spot beam band of spectrum and a portion of a regional band of spectrum, wherein the spot beam antenna has a spot beam coverage area; a regional antenna operable over the regional band of spectrum with a regional beam coverage area that overlaps with the spot beam coverage area, wherein the regional antenna is to receive an uplink signal from an uplink location geographically outside of the spot beam coverage area; an analog-to-digital converter to digitize signals received by the regional uplink antenna and the spot beam antenna to produce digitized regional band signals and digitized spot beam signals, respectively; a digital cancellation circuit to subtract the digitized spot beam signals from the digitized regional band signals to obtain a clean regional band signal; and a digital channelizer to route uplink channels to downlink channels in both the clean regional band signal and the digitized spot beam signals.

In yet another aspect, the present application describes a satellite payload for mitigating an imbalance in uplink and downlink availability for satellite communications. The payload includes a receive antenna and amplifiers to receive an uplink signal containing a plurality of channels in a band of spectrum at a satellite; an analog-to-digital converter to covert the band of spectrum to digital; a digital channelizer to channelize the digitized band of spectrum to obtain the plurality of channels and to route each of the plurality of channels to a respective downlink channel; a digital-to-analog converter and an RF up-converter to convert each downlink channel to an analog RF downlink channel; an output multiplexer to frequency division multiplex the analog RF downlink channels into a band of downlink spectrum; and a transmit antenna to transmit the band of downlink spectrum.

Other example embodiments of the present disclosure will be apparent to those of ordinary skill in the art from a review of the following detailed description in conjunction with the drawings.

Example embodiments of the present disclosure are not limited to any particular type of satellite or antenna.

Satellite Overview

Satellites are devices positioned in orbital space that are used for various purposes. In one example embodiment, the satellites are communication satellites. That is, they are positioned in orbital space for the purpose of providing communications. For example, communication satellites are designed to relay communication signals between two end-points (which may be stationary or mobile) to provide communication services such as telephone, television, radio and/or internet services.

The satellites may employ a variety of orbital paths around the Earth. For example, satellites may have geostationary orbits, molniya orbits, elliptical orbits, polar and non-polar Earth orbits, etc. Communication satellites typically have geostationary orbits. That is, the satellites have a circular orbit above the Earth's equator and follow the direction of the Earth's rotation. A satellite in such an orbit has an orbital period equal to the Earth's rotational period, and accordingly may appear at a fixed position in the sky for ground stations.

Communication satellites are typically spaced apart along the geostationary orbit. That is, the satellites are positioned in orbital slots. The satellite operators coordinate their use of orbital slots with each other under international treaty by the International Telecommunication Union (ITU), and the separation between slots depends on the coverage and frequency of operation of the satellites. For example, in at least some example embodiments, the separation between satellites may be between 2-3 degrees of orbital longitude. In at least some example embodiments, the separation between satellites may be less than 2 degrees of separation. The separation of the satellites in such a manner allows for frequency reuse for both uplink and downlink transmission. For example, by separating adjacent satellites by a distance greater than the transmitting beamwidth (i.e. the angle, measured in a horizontal plane, between the directions at which the power of the beam is at least one-half its maximum value) of an antenna associated with the ground station for uplink transmission, the same frequency for the communication signals may be employed to uplink to adjacent satellites with interference at or below the coordinated level. Similarly, if the separated distance between the adjacent satellites is greater than the receiving beamwidth of the antenna associated with the ground station for downlink transmission, the same frequency for the communication signals may be employed to downlink from adjacent satellites with interference at or below the coordinated level.

In order to perform communication functions, the satellite is equipped with various components. For example, the satellite may include a communication payload (which may further include transponders, one or more antennas, and switching systems), engines (to bring the satellite to the desired orbit), tracking and stabilization systems (used to the orient the satellite and to keep the satellite in the right orbit), power subsystems (to power the satellite) and command and control subsystems (to maintain communication with ground control stations).

The transponder of the satellite forms a communication channel between two end-points to allow for communications between the two end-points. The transponder also defines the capacity of the satellite for communications.

The antenna of the satellite transmits and receives communication signals. More specifically, the antenna is an electronic component that converts electric currents (which may be generated by a transmitter) to propagating radio frequency (RF) signals during transmission, and converts induced RF signals to electric currents during reception. In at least some example embodiments, the antenna may be associated with an amplifier which may amplify the power of the transmitted or received RF signals.

The communication signals may be microwave signals. Microwave signals are RF signals that have wavelengths ranging from as long as one meter to as short as one millimeter. Equivalently, the frequency of the RF signals may range from 300 MHz to 300 GHz. More particularly, the communication signals are within certain frequency bands of microwave signals as they are more suited for satellite communications. For example, in at least some example embodiments, a satellite may operate within the frequency of the C-band defined by the ITU. The C-band is a portion of the electromagnetic spectrum that ranges from approximately 4 GHz to 8 GHz. That is, the communication signals are transmitted by and received at the satellite within such a frequency range.

In some cases, the satellite may operate within frequencies higher than 8 GHz. For example, the satellite may operate within the frequency of the Ku-band. The Ku-band is the portion of the electromagnetic spectrum that ranges from approximately 10 GHz to 18 GHz.

In at least some example embodiments, the satellite may operate within other high frequencies, above the Ku-band. For example, the satellite may operate within the Ka-band frequency. The Ka-band is the portion of the electromagnetic spectrum that ranges from approximately 26.5 GHz to 40 GHz (at present the assigned slots for fixed satellite service (FSS) are 27-31 GHz for uplink and 17.7-21.2 GHz for downlink).

In some examples, the satellite may be configured to operate in more than one band. In one example, the satellite may be equipped to receive and transmit signals within the C-band, Ku-band, and Ka-band.

It will be appreciated that the satellites may operate within other microwave frequency bands. For example, the satellites may operate in any one of the defined microwave frequency bands ranging in frequencies from approximately 1 GHz to 170 GHz. Examples of such frequency bands may include the X-band, etc.

A conventional analog payload architecture is illustrated in FIG. 1 by way of a block diagram of an example satellite payload 10. The payload 10 includes a receive antenna 12, such as a reflector antenna, which collects incoming RF signal. The received signal is amplified by a low noise amplifier 14 and the amplified signal is down-converted by down-converter 16 to the desired downlink frequency band. The downconverted signal is then channelized by an input demultiplexer 18 (IMUX) so as to map individual analog uplink channels to their corresponding downlink channels in accordance with a predefined and fixed frequency plan. Each channel is then amplified using individual linearized travelling wave tube amplifiers 20 (LTWTA) with a redundancy ring switch network. The output from the LTWTAs 20 are then combined again by an output multiplexer 22 (OMUX) and fed to a transmit antenna 24 for transmission back to the Earth.

Some modern satellites use digital channelizers to digitize the incoming RF signal and make the payload more configurable. Such a digital payload typically includes a down-converter to convert the incoming spectrum to IF, an analog-to-digital converter (ADC), digital multi-channel demultiplexer, digital switching matrix, digital-to-analog converter (DAC), up-converters, power amplifiers and multiple spot or phased-array antenna networks. A digital payload satellite is more flexible, but is also more costly, partly due to the use of a digital beamforming network, regenerative processor, and multi-spot/phased-array antenna networks. More significantly, the available solid state power amplifier (SSPA) output RF power for phased-array signals results in a lower output power spectral density as compared to the power spectral density available using conventional linear travelling wave tube amplification. In other words, the output power and efficiency of space-qualified LTWTA is higher than space-qualified SSPA, meaning better downlink EIRP density is achievable with LTWTA. The lower EIRP density available using SSPA results in the need for a larger receiving dish at the downlink earth station.

Hybrid Digital-Analog Payload

In accordance with one aspect of the present application, the uplink frequency is digitized and channelized, but the downlink maintains a conventional analog transmission architecture, resulting in what may be referred to herein as a "hybrid" payload.

In accordance with another aspect of the present application, the digitization of the full uplink spectrum allows for mitigating imbalance in spectrum allocation amongst uplink and downlink channels.

By digitizing the uplink frequency, the available frequency resources assigned for satellite communication by the ITU can be utilized more efficiently compared to a conventional payload implementation. For example, there is an imbalance of Ku band frequency resources for the uplink and downlink band for Region 3. Defined by the ITU, Region 3 includes most of Oceania and most Asian countries, but excluding Russia and former Soviet Union countries. The Ku-band uplink frequency bands are 13.75-14.00 GHz (250 MHz bandwidth (BW), the extended Ku) and 14.00-14.50 GHz (500 MHz BW, the standard Ku), giving a total uplink BW of 750 MHz. In Region 3, the ITU has specified three available downlink frequency bands: 10.95-11.20 GHz (250 MHz, the $2^{nd}$ extended Ku), 11.45-11.70 GHz (250 MHz, the $1^{st}$ extended Ku), and 12.25-12.75 GHz (500 MHz, the standard Ku). The total downlink BW is 1000 MHz. With this mismatch, the downlink Ku-band frequency resource cannot be fully utilized. The satellite operator can only use a maximum of 750 MHz in a wide beam or spot beam configuration. Moreover, the actual BW that can be used in a Ku conventional spacecraft is around 648 MHz because the traditional analog IMUX/OMUX combination required a guard-band of about 10%.

Figure 2:
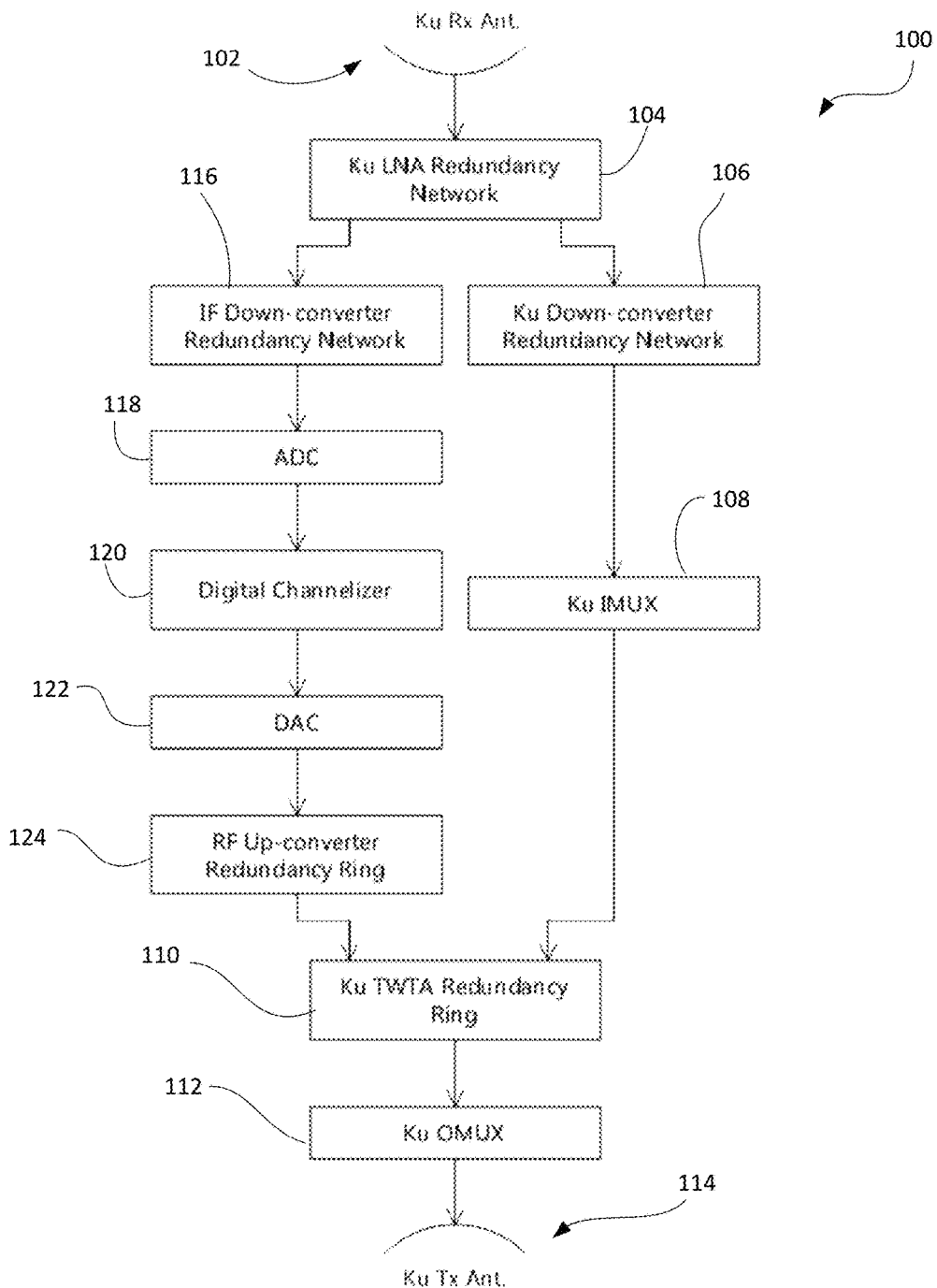
FIG. 2 is a block diagram of an example of a hybrid digital-analog satellite payload in the Ku band.

Reference is now made to FIG. 2, which shows a block diagram of an example hybrid satellite payload 100. The payload 100 in this example is for uplink and downlink of Ku band channels. Accordingly, the payload 100 includes a Ku band receive antenna 102 and a Ku band transmit antenna 114. The payload 100 further includes the elements of a conventional analog architecture, including a LNA redundancy network 104, Ku band down-converters 106, Ku band IMUX 108, Ku band LTWTA ring 110, and Ku OMUX 112. These elements function to channelize and route the uplink band in order to implement the predetermined fixed uplink-to-downlink frequency plan. However, the example hybrid satellite payload further includes a digital portion. The digital portion digitizes the entire incoming band of Ku spectrum and extracts the guard bands between the Ku channels. Extracted guard bands may then be grouped to form one or more Ku downlink channels, thereby adding up to 10% of uplink capacity. In other words, by digitizing the uplink band and extracting and grouping the guard bands to form one or more downlink channels, the hybrid satellite payload 100 is able to recover about 102 MHz of unused uplink capacity.

In this example, the digital portion of the hybrid satellite payload 100 includes an IF down-converter 116 to convert the incoming RF Ku band of spectrum to IF. The full down-converted band of spectrum is then digitized in an ADC 118 and digitally channelized with a digital channelizer 120. The digital channelizer 120 in this example sub-channelizes the digitized band of spectrum to extract portions of the spectrum corresponding to guard bands in the standard Ku-band analog RF plan. A standard Ku band channel is 54 MHz with 6 MHz guard bands. The digital channelizer 120 then combines or groups digitized guard bands to form one or more composite channels. Those composite channels are then converted to analog using a DAC 122 and up-converted to the downlink RF frequency for Ku band using an RF up-converter 124. The up-converted composite channels are then fed into the Ku band LTWTA ring 110 together with the de-multiplexed analog Ku band channels form the Ku IMUX 108. Together, they are amplified by the LTWTA ring 110 and are multiplexed by the Ku OMUX 112 to produce the Ku downlink band of RF spectrum that is then transmitted by the transmit antenna 114. It will be appreciated that the transmit antenna 114 and the receive antenna 102 may be the same physical antenna in many implementations.

Figure 3:
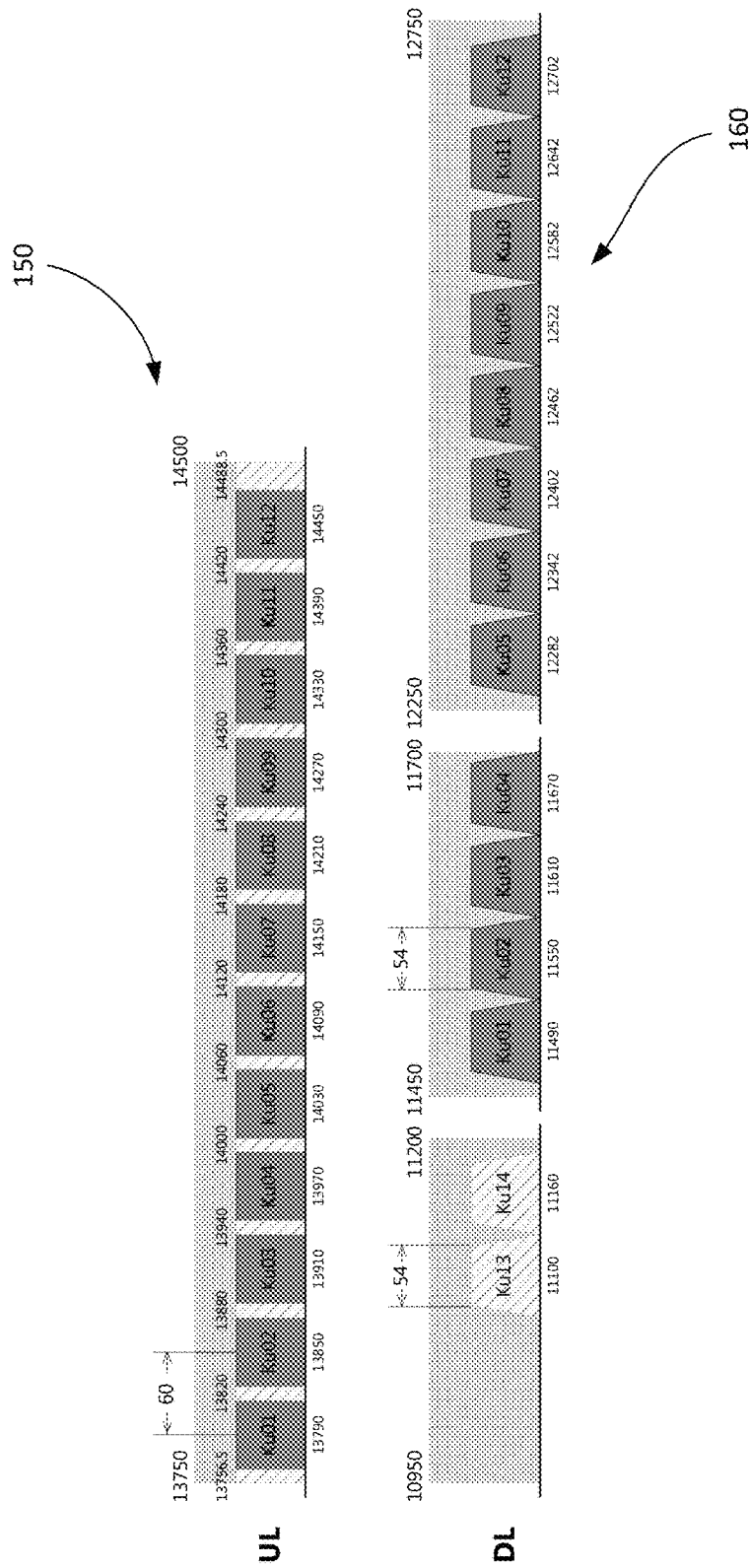
FIG. 3. shows example uplink and downlink frequency plans for the example payload of FIG. 2.

FIG. 3 diagrammatically shows example uplink frequency plan 150 and example downlink frequency plan 160 corresponding to one implementation of the example hybrid satellite payload 100 (FIG. 2). In this example, the uplink frequency plan 150 shows 12 Ku band uplink channels in a conventional frequency plan. The center frequency of each 54 MHz channel is separated by 60 MHz from the centre frequency of adjacent channels, meaning a 6 MHz guard band lies between each of the adjacent channels. Data may be inserted in the guard bands of the uplink spectrum. At the satellite, the spectrum is digitized and the guard bands are extracted and grouped to form one or more composite channels.

In this example, the guard bands are used to form two downlink channels in the $2^{nd}$ extended Ku band between 10.95 GHz and 11.2 GHz. In the illustrated example, the composite channels correspond to downlink channels at 11.1 GHz and 11.16 GHz (i.e. Ku13 and Ku14). It will be noted that, in this example, the conventional Ku band uplink channels have been routed to Ku downlink channels Ku01 through Ku12, each having a bandwidth of 54 MHz and separated by guard bands, in the $1^{st}$ extended Ku and standard Ku bands spanning 11.45-11.7 GHz and 12.25-12.75 GHz, respectively.

Figure 4:
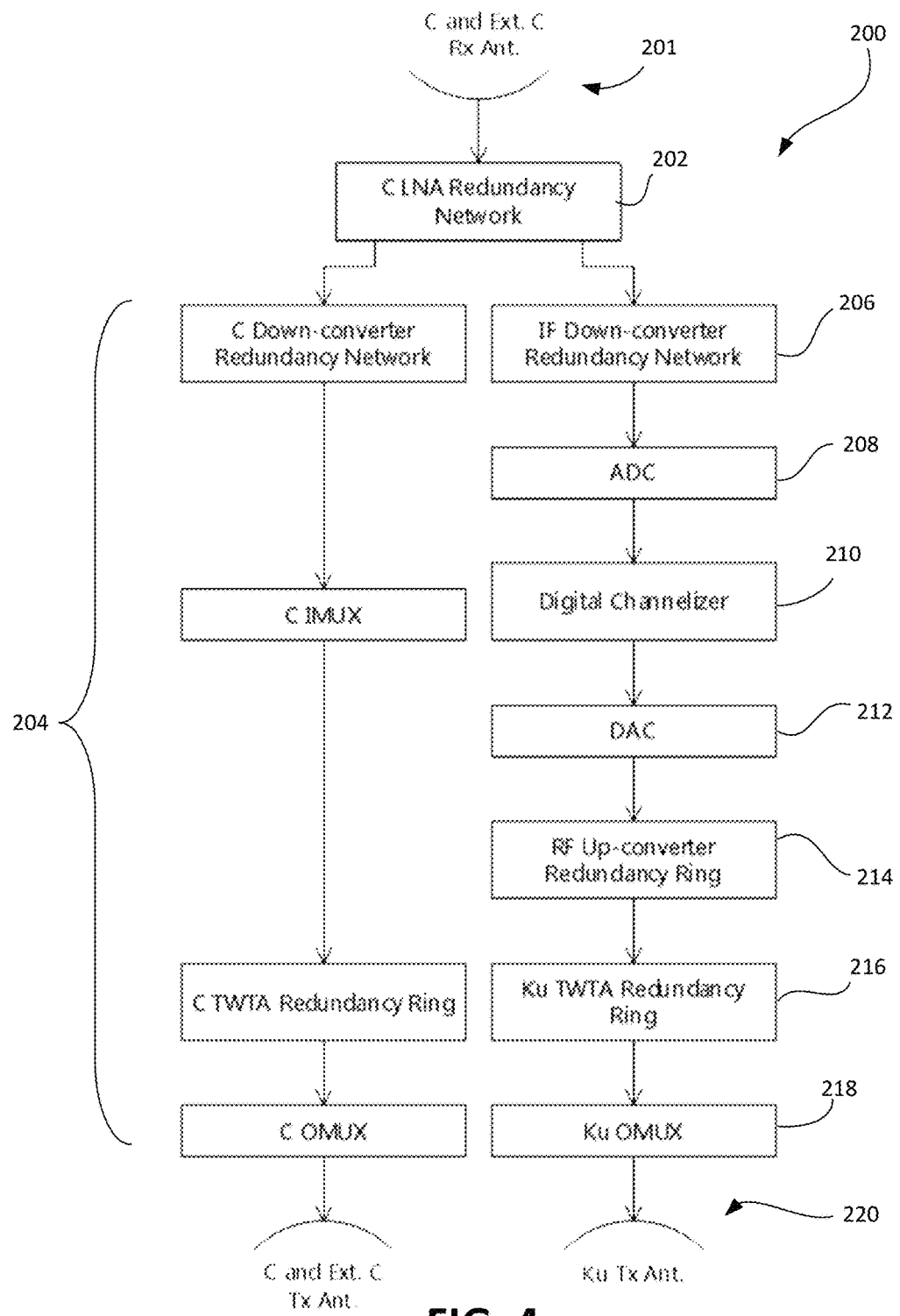
FIG. 4 is a block diagram of another example hybrid analog-digital payload.

Reference is now made to FIG. 4, which shows a block diagram of another example hybrid satellite payload 200. The payload 200 in this example is for uplink and downlink of C band and Ku band channels, although the figure does not show the uplink portion of the Ku band, which may, for the purposes of this example, be presumed to be a conventional analog Ku uplink feeding into a Ku OMUX 218. The payload 200 is designed to digitize and extract data from the guard bands of the C band spectrum and to create Ku band downlink channels from the C band guard bands. In other words, the C band guard bands are used to send uplink data that is then downlinked in the excess Ku band capacity.

An antenna 201 for C band and Extended C band receives signals from ground stations. Those signals are amplified in an LNA network 202, and the amplified signals are fed into a conventional analog C band signal path 204, including a C band IMUX, LTWTA amplifiers, and C band OMUX, all configured in accordance with a defined frequency channel routing plan. Those output signals form the analog C band signal path 204 are then beamed back to the Earth using a C band transmit antenna.

The amplified incoming C band and Extended C band signals from the LNA network 202 are also input to a digital processing path, which includes an IF down-converter 206, an ADC 208, a digital channelizer 210, a DAC 212, a Ku band RF up-converter 214 and a Ku band LTWTA 216 that feeds Ku band signals into the Ku OMUX 218. In this processing path, the C band spectrum is downconverted to IF and is digitized. The digital channelizer 210 then extracts the guard bands within the C band spectrum and group or reassembles the guard band data to form one or more Ku band downlink channels. These Ku band downlink channels are then converted back to analog, upconverted to the Ku band frequency and amplified in the LTWTA 216 before being combined in the Ku OMUX 218 with the regular Ku band channels from the Ku band uplink/downlink payload (not illustrated). The full set of Ku band (and $1^{st}$ extended Ku and $2^{nd}$ extended Ku) channels are then transmitted using the Ku transmit antenna 220.

Figure 5:
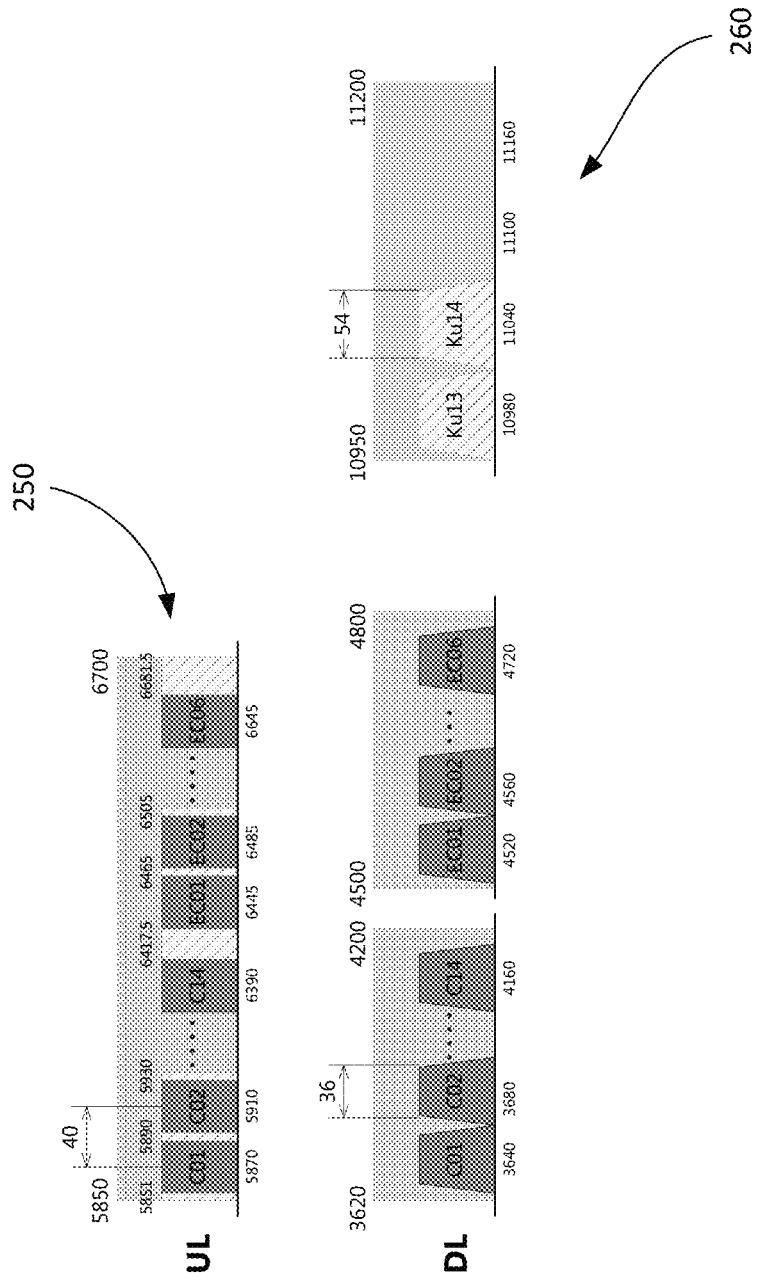
FIG. 5 shows example uplink and downlink frequency plans for the example payload of FIG. 4.

FIG. 5 diagrammatically shows example uplink frequency plan 250 and example downlink frequency plan 260 corresponding to one implementation of the example hybrid satellite payload 200 (FIG. 4). In this example, the uplink spectrum 250 shows 14 standard C band uplink channels and 6 extended C band uplink channels in a conventional frequency plan. The center frequency of each 36 MHz channel is separated by 40 MHz from the centre frequency of adjacent channels, meaning a 4 MHz guard band lies between each of the adjacent channels. Data may be inserted in the guard bands of the uplink spectrum. At the satellite, the spectrum is digitized and the guard bands are extracted and grouped to form one or more Ku band composite channels.

In this example, the guard bands are used to form two downlink channels in the $2^{nd}$ extended Ku band between 10.95 GHz and 11.2 GHz. In the illustrated example, the composite channels correspond to downlink channels at 10.98 GHz and 11.04 GHz (i.e. Ku13 and Ku14). It will be noted that, in this example, the conventional C band and extended C band uplink channels have been routed to C band downlink channels C01 through EC06, each having a bandwidth of 36 MHz and separated by guard bands.

Figure 6:
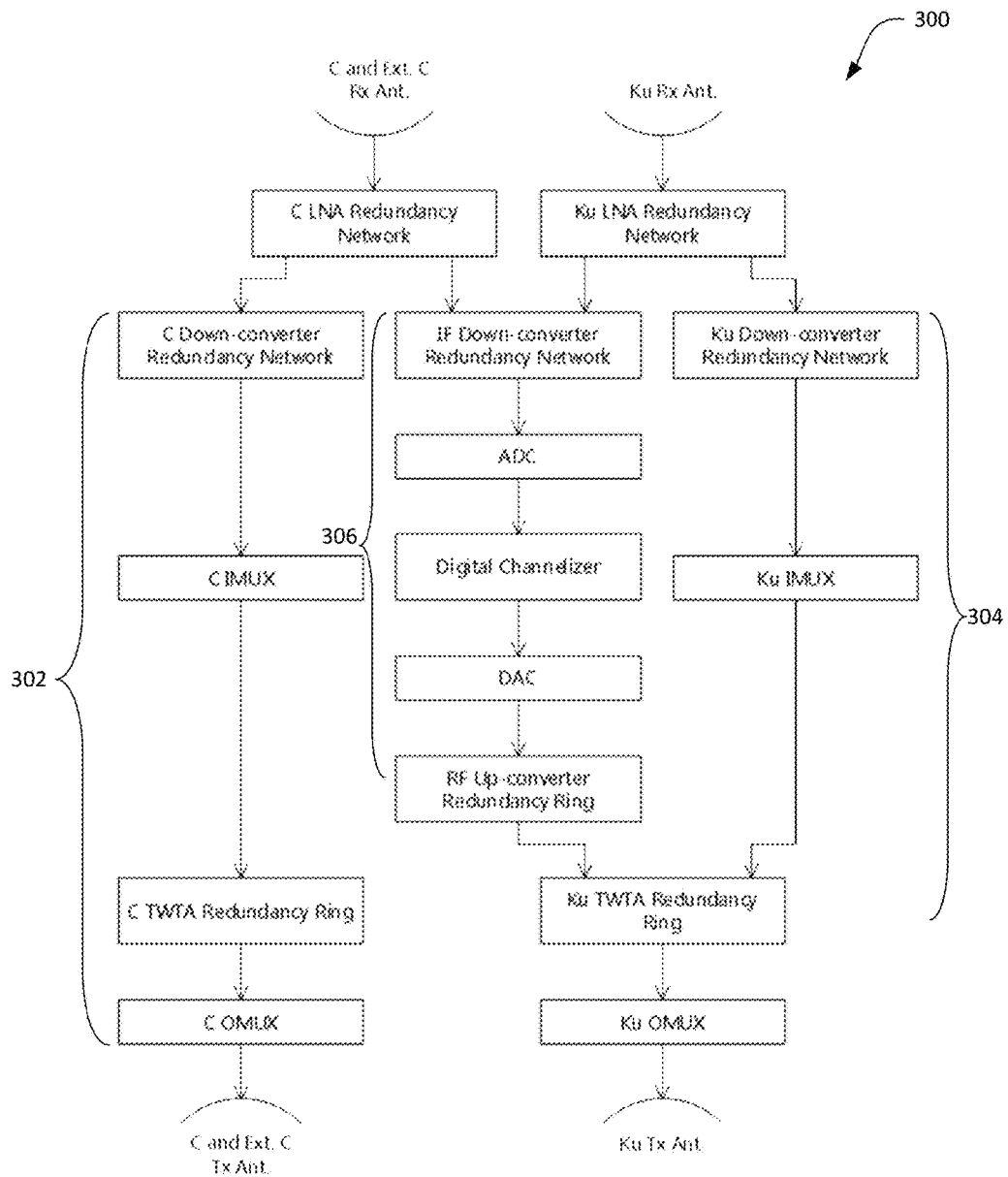
FIG. 6 is a block diagram of a further example hybrid analog-digital payload.

In yet a further example, guard bands from both the C band uplink and Ku band uplink may be used to create composite Ku downlink channels. FIG. 6 shows, in block diagram form, one example hybrid satellite payload 300 for both C and Ku band uplink digitization. This example payload 300 includes a C band analog processing path 302 and a Ku band analog processing path 304. A digital path 306 receives both the C band uplink spectrum and the Ku band uplink spectrum, converts both to IF, and digitizes both. The digitized spectrum is channelized, extracting the guard bands of both the C band spectrum and Ku band spectrum and forming composite Ku band downlink channels from the guard band data. The composite channels are then converted to analog, up-converted, amplified, and fed into a Ku band OMUX for transmission with the regular Ku band channels.

Figure 7:
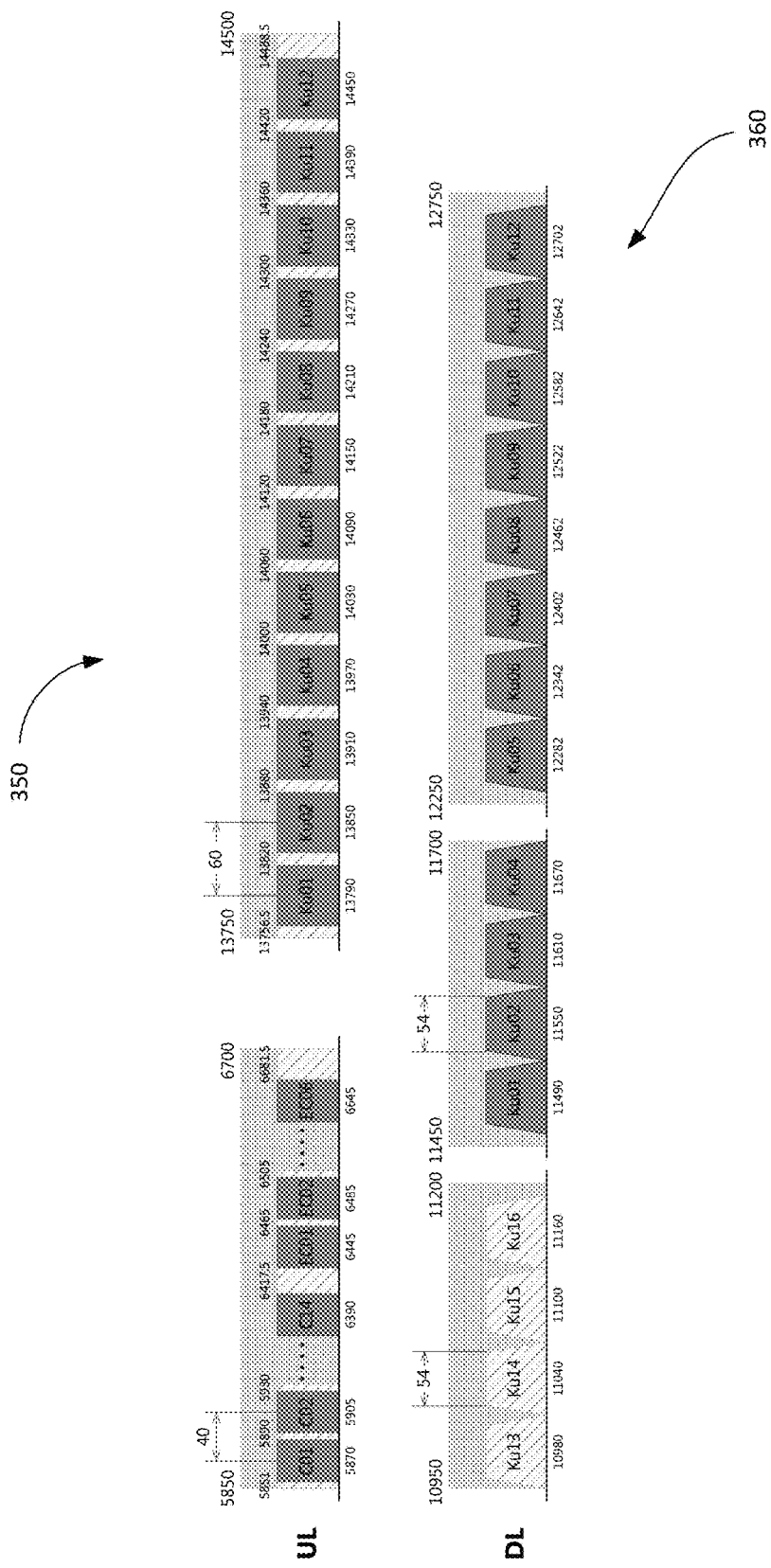
FIG. 7 shows example uplink and downlink frequency plans for the example payload of FIG. 6.

FIG. 7 diagrammatically shows example uplink frequency plan 350 and example downlink frequency plan 360 corresponding to one implementation of the example hybrid satellite payload 300 (FIG. 6). In this example, the uplink frequency plan 350 shows 14 standard C band uplink channels and 6 extended C band uplink channels in a conventional frequency plan, and 12 Ku band channels in a conventional frequency plan. Data may be inserted in the guard bands of the uplink spectrum in both the C band and the Ku band. At the satellite, the spectrum is digitized and the guard bands are extracted and grouped to form one or more Ku band composite channels. Note the conventional C band downlink spectrum is not illustrated.

In this example, the guard bands from C band and Ku band are used to form four Ku downlink channels in the $2^{nd}$ extended Ku band between 10.95 GHz and 11.2 GHz.

It will be appreciated that, in other embodiments, various combinations of other bands of spectrum may be used, including Ka band, X band, etc., to send data in guard bands for use in creating composite Ku band downlink channels. In further embodiments, guard band data may be used to create composite downlink channels for bands other than the Ku band.

In yet another aspect, the present application discloses a hybrid satellite payload for a frequency plan with no uplink guard bands by using digital channelization.

In FIG. 2, the Ku band satellite payload includes a conventional signal path through the Ku band down-converter 106 and the Ku band IMUX 108. These elements channelize the analog uplink signal in accordance with the pre-designed uplink-downlink frequency plan. The channels are then each fed into the individual LTWTAs 110. The parallel digital path digitizes the band of spectrum, extracts data from the guard bands, and groups the guard band data to form one or more downlink channels, which are then converted to analog and multiplexed together with the conventionally routed analog downlink channels.

Figure 19:
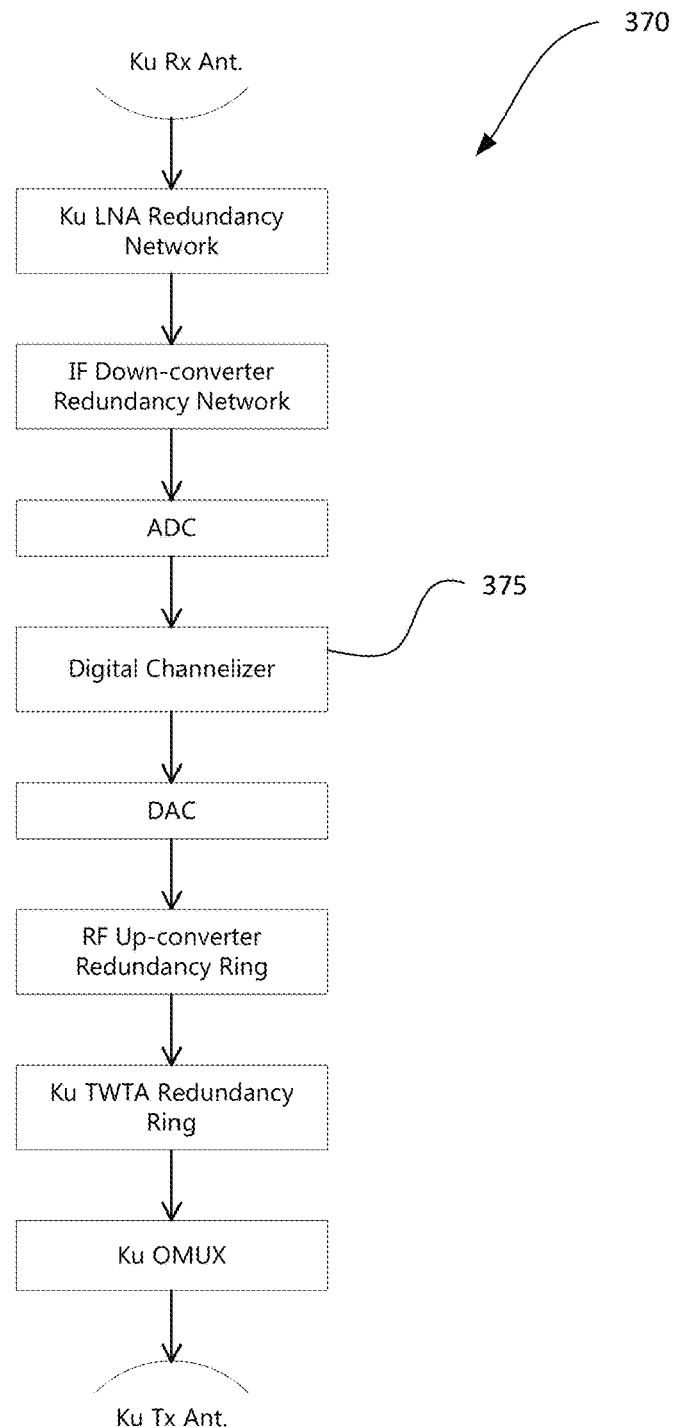
FIG. 19 shows a block diagram of an example hybrid satellite payload without analog input multiplexer.
Figure 20:
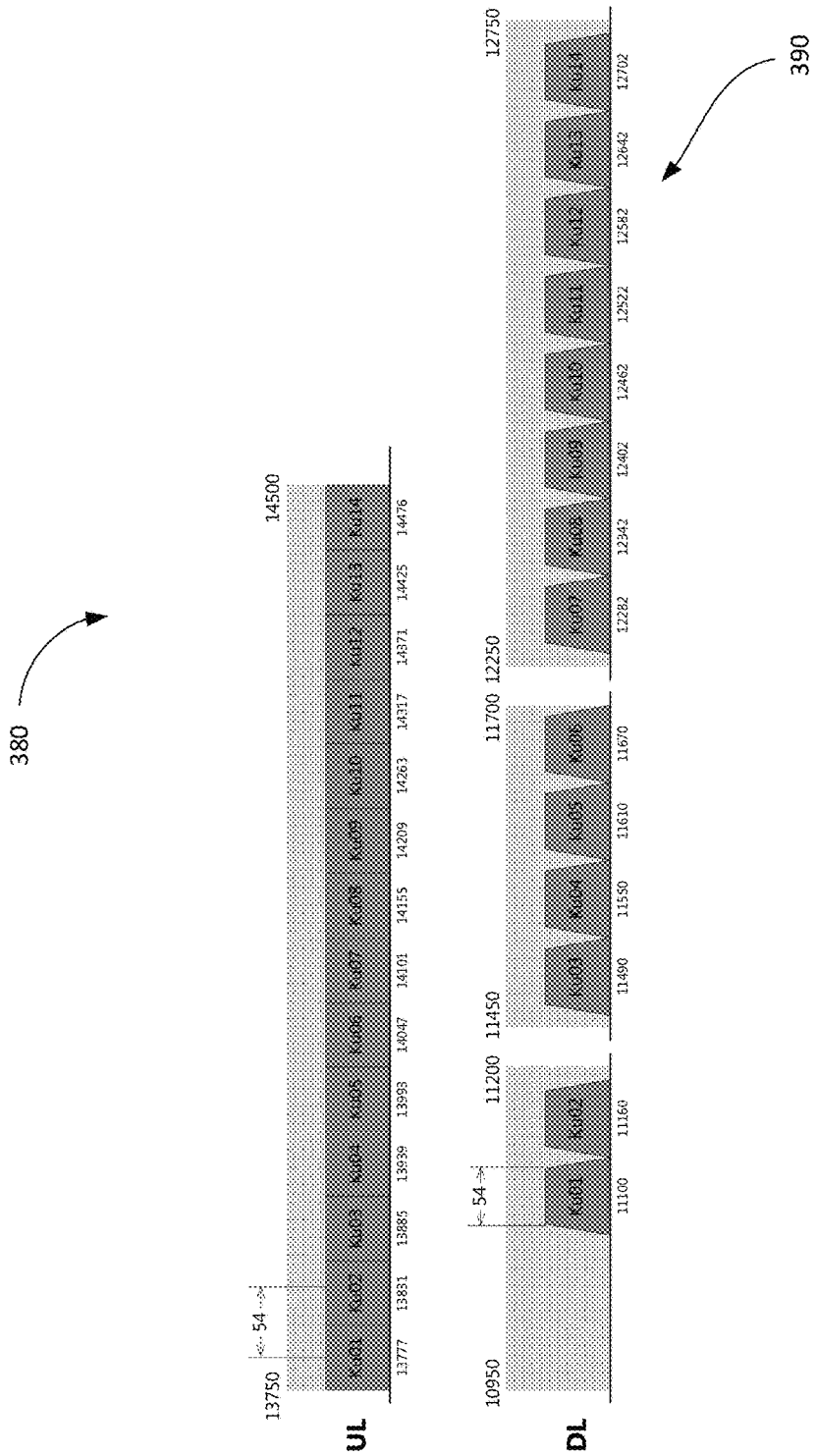
FIG. 20 shows example uplink and downlink frequency plans for the example payload of FIG. 19.

Reference is now made to FIGS. 19 and 20. FIG. 19 shows, in block diagram form, an example hybrid satellite payload 370 without an analog IMUX and featuring full digital channelization of the uplink band of spectrum. FIG. 20 shows an uplink frequency plan 380 and downlink frequency plan 390 for the example hybrid satellite payload 370 of FIG. 19. In this example implementation, rather than preserving the conventional frequency plan and analog channelization, the payload 370 digitizes and channelizes the full band of spectrum. It will be noted that FIG. 19 is the same as FIG. 2, except for the elimination of the analog path, i.e. the elimination of IMUX 108 and Ku band down-converter 106. The payload 370 includes a digital channelizer 375 with sufficient bandwidth to digitally channelize the full band of spectrum (in this example, the Ku uplink band from 13.75 GHz to 14.5 GHz.

As illustrated in the uplink frequency plan 380, digital channelization allows for elimination of the guard bands as the full band of spectrum is available for data transmission.

Parallel Output Multiplexers

In another aspect, the digital channelization of spectrum at the satellite allows for greater flexibility in ensuring efficient utilization of available uplink and downlink spectrum. In some embodiments, the downlink path may be configured to include a second OMUX and transmit antenna feed, where the second OMUX is designed with channels centered at the guard bands of the channels in the primary OMUX.

Figure 8:
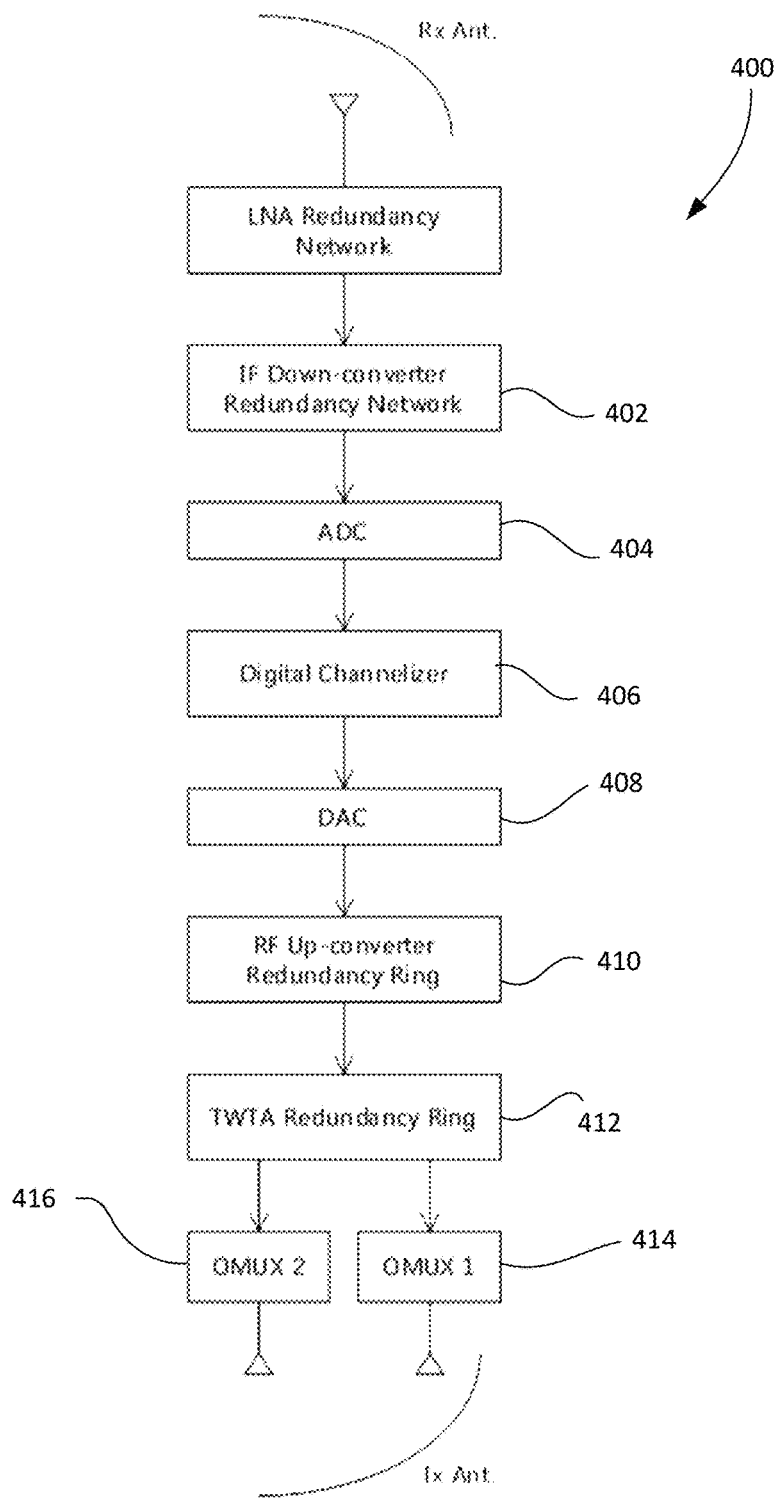
FIG. 8 is a block diagram of an example satellite payload with dual output multiplexers and dual output antenna feeds on same reflector.

Reference will now be made to FIG. 8, which shows, in block diagram form, an example hybrid payload 400 with dual feed downlink. In this example the payload 400 is configured for operation in the C band spectrum. The uplink may include additional channel data inserted in guard bands. As illustrated, the received data is down-converted to IF by a down-converter 402, digitized by ADC 404, and channelized by digital channelizer 406. The channelizer 406 routes the standard C band 36 MHz channels to corresponding 36 MHz C band downlink channels, which are then converted to analog by DAC 408, up-converted to C band frequencies by up-converter 410, amplified by LTWTA 412, and multiplexed by OMUX 1 414 for output via the transmit antenna.

The channelizer 406 also extracts data from the guard bands between the C band uplink channels and routes that data to OMUX 2 416. The OMUX 2 416 is configured with channels centered at one or more of the guard band frequency of OMUX 1 414. In some cases, the channels of OMUX 2 416 have a bandwidth that corresponds to the respective guard bands of OMUX 1 414. In some cases, the channels of OMUX 2 416 have a bandwidth wider than the guard bands of OMUX 1 414, which may be expected to cause interference if the channels of OMUX 1 414 are fully utilized; however, the utilization rate of each channel may be less than 100%, particular in the case of multi-carrier transmissions in a channel. In such as case, OMUX 2 416 with partially overlapping channels affords an opportunity to improve utilization of the available spectrum.

Figures 9A, 9B, 9C:
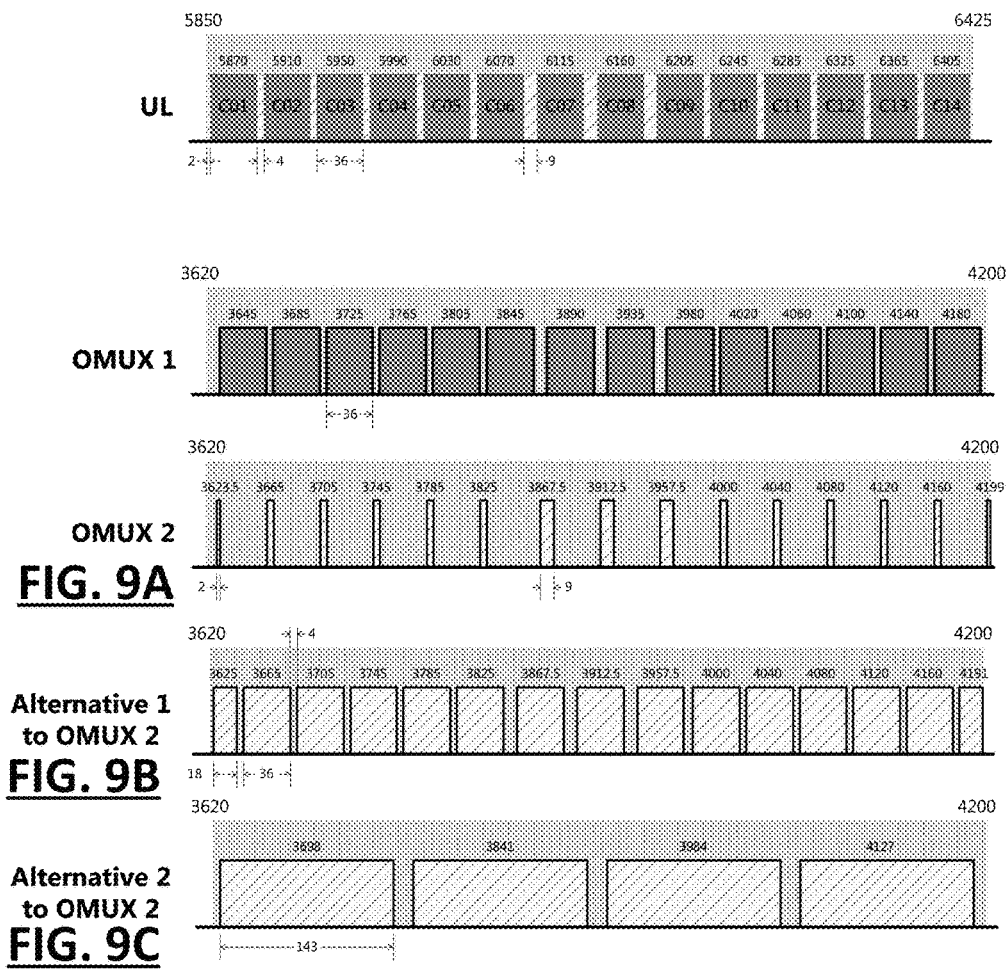
FIGS. 9A, 9B, and 9C shows example uplink and downlink frequency plans for the example payload of FIG. 8.

FIGS. 9A, 9B, and 9C diagrammatically show example uplink frequency plan and downlink frequency plans corresponding to one implementation of the example hybrid satellite payload 400 (FIG. 8). In particular, in this example the C band uplink frequency plan features 14 36 MHz channels separated by guard bands. In some cases, the guard bands may be the standard 4 MHz guard bands; however, in other embodiments the guard bands may have different widths, such as 6 MHz, 9 MHz, etc. The uplink frequency plan may be designed with one or more different-sized guard bands to accommodate specialty channels using a particular bandwidth. In the example shown in FIG. 9A, most of the guard bands are 4 MHz bands, but a few guard bands are 9 MHz wide.

FIG. 9A also shows the corresponding downlink frequency plan via OMUX 1, which has the same channel allocation as the uplink spectrum. In particular, OMUX 1 shows 36 MHz channels centered with the same frequency spacing as the uplink, leaving the same layout of guard bands. In some embodiments, the layout could be different, i.e. the guard bands need not have the same arrangement as in the uplink spectrum.

Also shown in FIG. 9A is the channel plan designed for OMUX 2. In this example, it will be noted that the channels of OMUX 2 are centered at the guard bands of OMUX 1. In fact, the channel bandwidths of OMUX 2 correspond to the sizes of the guard bands of OMUX 1.

FIG. 9B shows another example channel plan for OMUX 2. In this alternative plan, the OMUX 2 channels are again centered at the midpoints of the guard bands of OMUX 1, but in this case the channels of OMUX 2 are wider such that they partially overlap the OMUX 1 channels on either side of the guard band. In this example, the OMUX 2 channels are each 36 MHz channels (except for the edge channels, which are 18 MHz wide). This configuration of channels in OMUX 2 increases flexibility for dynamically allocating downlink channels between OMUX 1 and OMUX 2 so as to maximize the used downlink frequency spectrum. For example, in a case in which one of the OMUX 1 transponders (channels) is operating in a multi-carrier mode that does not occupy the full 36 MHz bandwidth of the channel, other carriers/traffic may be routed through a partially overlapping OMUX 2 channel for downlink over the unused portion of the spectrum. The partial overlap of downlink channels available through the dual OMUX configuration allows for flexibility in dynamically routing traffic so as to improve the efficient allocation of available spectrum, such as in a case in which the downlink traffic has a bandwidth wider than just the guard band of OMUX 1, and too wide to fit in the unused portion of an OMUX 1 channel, but narrow enough to fit within the unused portion of spectrum in an OMUX 2 channel that partly overlaps two OMUX 1 channels.

Yet a further example is shown in FIG. 9C, in which OMUX 2 features four large bandwidth channels each overlapping three or more OMUX 1 channels. In this example, the OMUX 2 channel bandwidth is 143 MHz.

Combinations of these examples may also be used. For example, an example OMUX 2 may features some channels having a bandwidth the corresponds to guard bands in OMUX 1, and one or more channels having a larger bandwidth that partially overlaps the channel on either side of a guard band.

In one illustrative example, suppose that the OMUX 1 downlink channel centered at 3725 MHz supports 10 carrier slots, c1 to c10. If the OMUX 2 alternative 1 downlink channel centered at 3745 MHz is used, then it partly overlaps the downlink channel at 3725 MHz. In this example that may mean that carrier slots $c1-c5$ of OMUX 2 channel 3745 overlap with carrier slots $c6-c10$ of OMUX 1 channel 3725. In a case where only seven carrier slots are being used in OMUX 1 channel 3725, they may be allocated to carrier slots $c1-c7$, meaning that carrier slots $c3-c5$ of OMUX 2 are available to route other traffic. The OMUX 2 feed horn may point to a different geographic location than the feed horn for OMUX 1, meaning that the excess capacity may be used to supply signals to another location.

Figure 10:
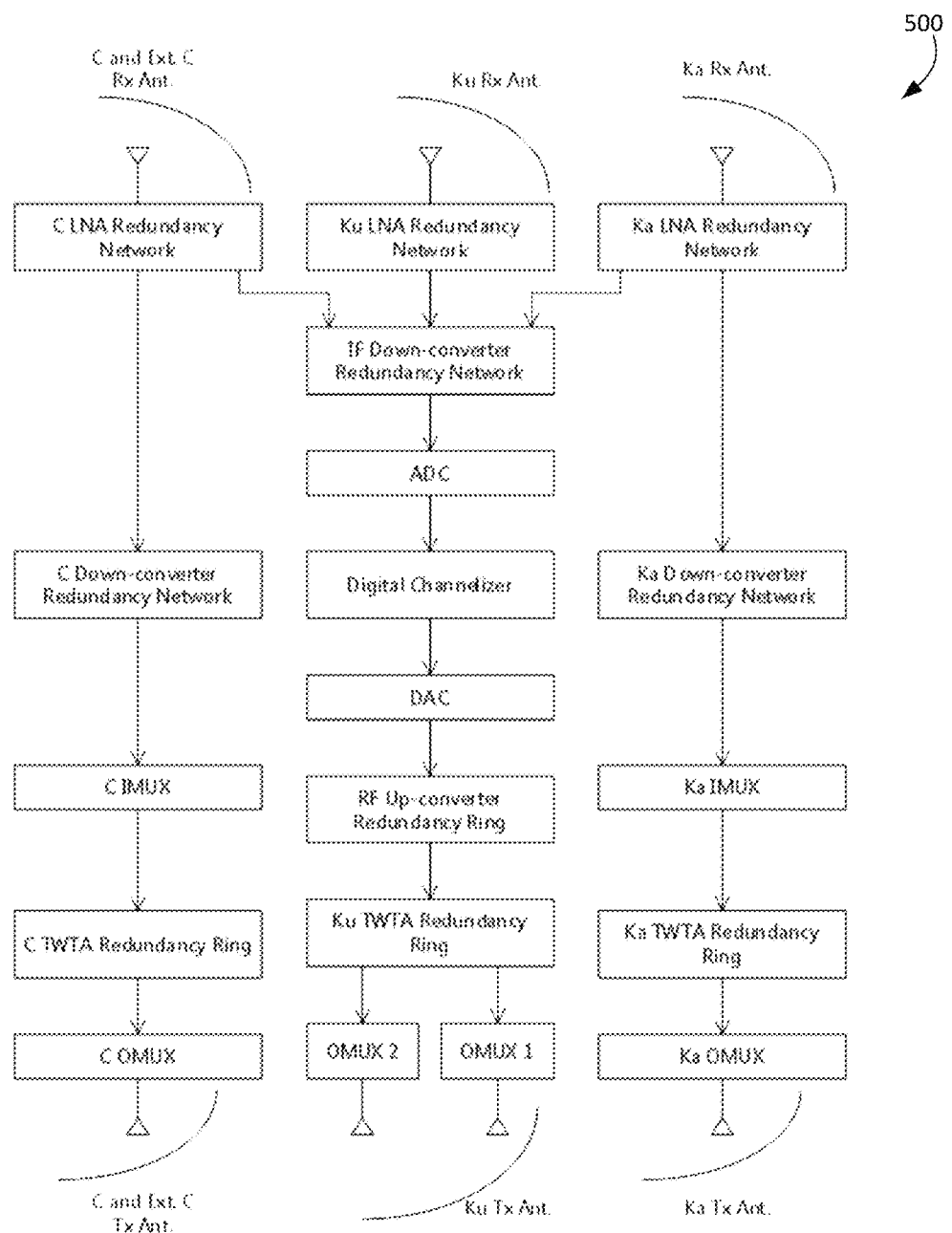
FIG. 10 is a block diagram of an example hybrid analog-digital payload with dual output multiplexers and dual output antenna feeds on same reflector.
Figure 11:
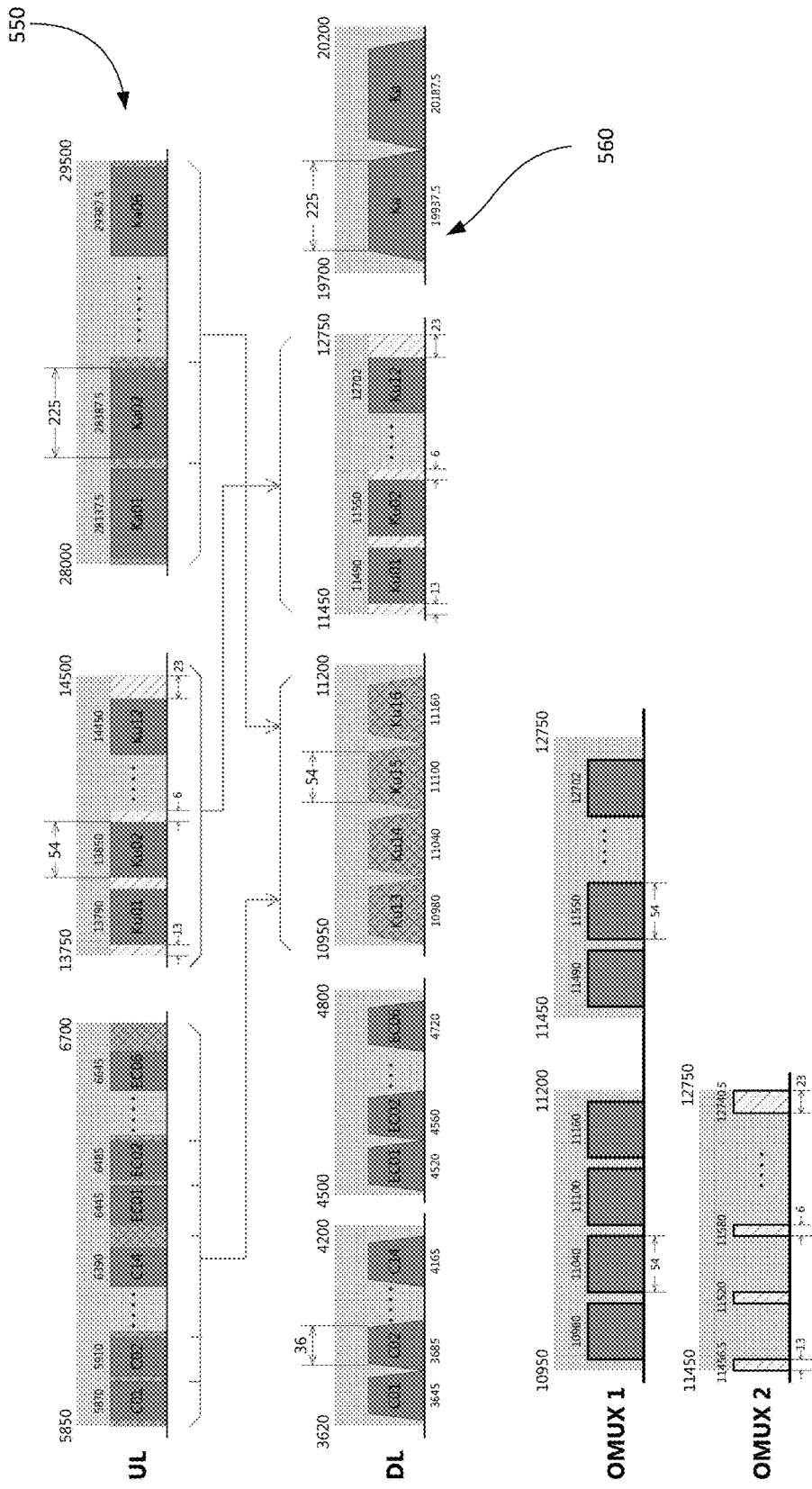
FIG. 11 shows example uplink and downlink frequency plans for the example payload of FIG. 10.

FIGS. 10 and 11 show a block diagram of an example payload 500 and corresponding example uplink frequency plan 550 and downlink frequency plan 560, respectively. This example payload 500 is configured to receive C band, Ku band and Ka band uplink spectrum, extract guard band data from the C band, Ku band and Ka band through digitization and channelization of that spectrum, and the formation of $2^{nd}$ extension Ku band channels composed from data obtained from the digitized guard bands. The Ku band downlink features a dual feed implementation with a conventional Ku OMUX, shown as OMUX 1, and a second Ku band downlink channel plan via OMUX 2. OMUX 2, in this example, features channels of various bandwidths centered at the guard bands of the Ku band channels routed through OMUX 1. This configuration has the potential to improve downlink Ku band utilization to about 97% in Region 3.

Dynamic Spectrum Reallocation Between Spot and Regional Beams

In order to increase the capacity for broadband access, frequency reuse amongst multiple spot beams or hybrid multi-spot/regional beams are commonly implemented. Usually for a given satellite, the bandwidth assigned to each spot beam is uniform and the frequency plan is fixed with little flexibility. However, the actual operational traffic loading is never evenly distributed geographically. The capacity demand on each spot beam may also change with time and the maturity of the terrestrial telecommunication infrastructures. Therefore, areas with high traffic demand may not always have sufficient services available and the regions with lower demand may have spare capacity that cannot be released for use elsewhere.

A hybrid regional/spot beam payload may alleviate this problem to some degree, as the bandwidth of a regional beam may be used to supplement the bandwidth of a spot beam as long as the spot beam is covered by the regional beam. By using digitization of uplink spectrum, capacity may be allocated dynamically with sub-channel routing. This may be realized by feeding the uplinks of a few selected spot beams and the regional beam into a digitizer and then routing the output to the corresponding beams according to actual traffic demand. If the capacity of the selected spot beam is fully engaged, then the satellite may reallocate vacant capacity from the regional beam to resolve this imbalance traffic issue.

Figure 12:
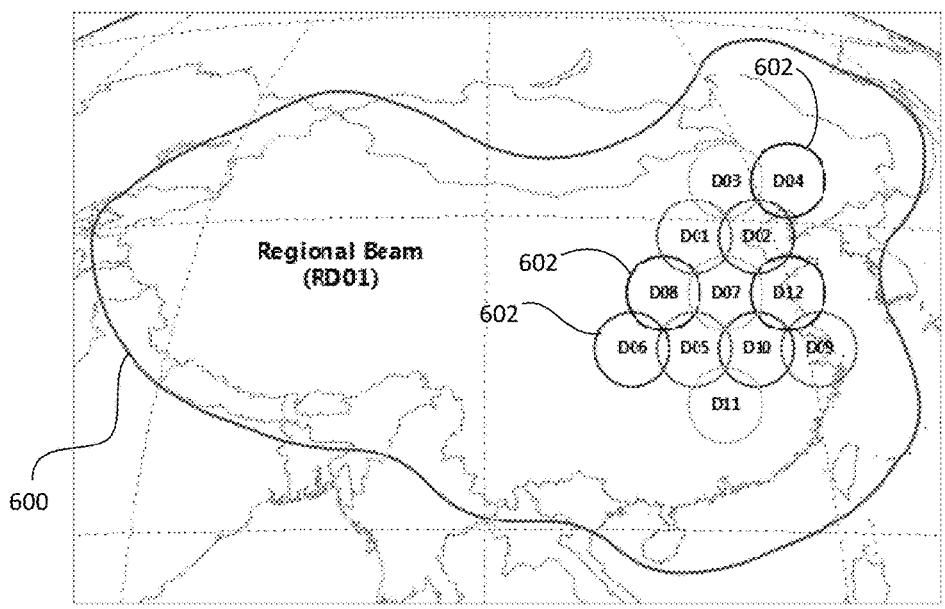
FIG. 12 diagrammatically shows coverage areas of a regional beam and spot beams.
Figure 13:
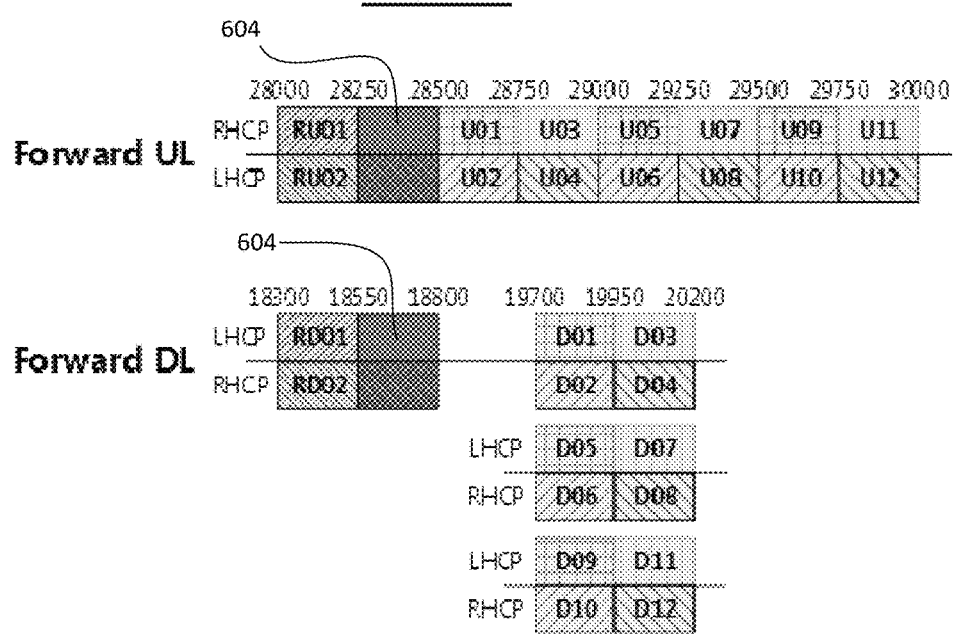
FIG. 13 shows example uplink and downlink frequency plans using a dynamic regional spectrum reallocation.

Reference is now made to FIG. 12 and FIG. 13. FIG. 12 shows an example of a regional beam coverage area 600, and 12 spot beam coverage areas 602 (individual labelled as D01, D02, . . . D12). FIG. 13, shows the uplink and downlink frequency plans for the regional beam (RU01, RU02, RD01 and RD02) and the spot beams, all operating in the Ka band. Left-hand circular polarization (LHCP) and right-hand circular polarization (RHCP) is used to allow frequency re-use. The regional beam covers all small spots but the frequencies assigned for the regional and spots beams are different. The uplink and downlink spot beams are indicated as U01/D01, U02/D02 U12/D12. The regional beam is designated as RU01/02 for the uplink and RD01/02 for the downlink. The regional beam takes 500 MHz nominal bandwidth for each of the two orthogonal polarizations. The spot beam nominal bandwidth is 250 MHz each in one of the two polarizations, as the standard 4-color reuse scheme (spot beams reused with the same color are non-adjacent to reduce the co-pol interference) is used for the spot downlinks.

If there is a high demand on spot beam U01/D01, then, using the input digital channelizer, part of the regional beam RU01/RD01 capacity may be dynamically reallocated to spot beam U01/D01. In this example, the re-allocatable 250 MHz frequency block of RU01/RD01 spectrum is indicated by reference numeral 604.

Figure 14:
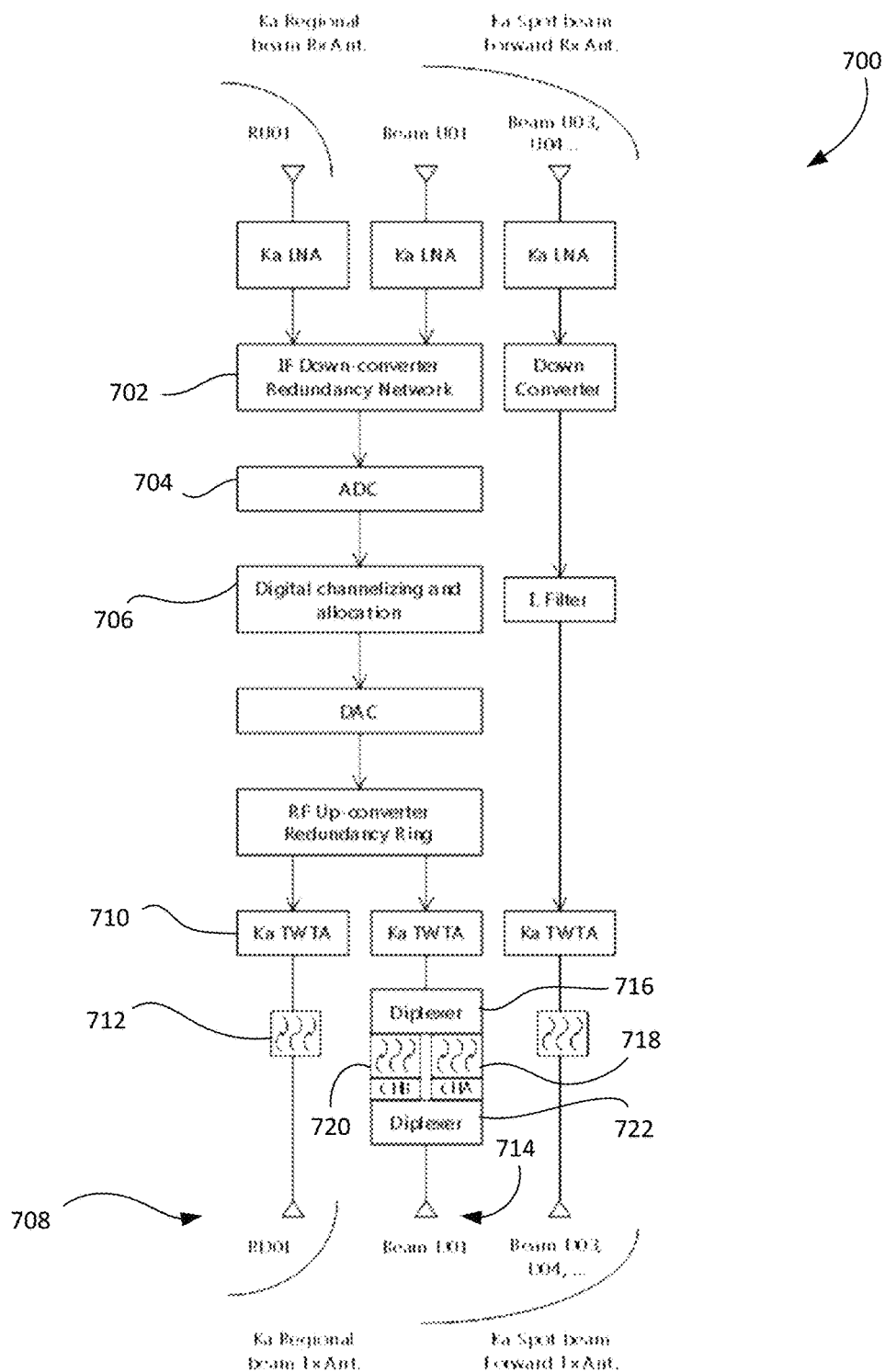
FIG. 14 is a block diagram of an example payload for realizing dynamic regional spectrum reallocation.

Reference is now made to FIG. 14, which shows, in block diagram form, an example payload 700 for dynamically reallocating regional beam spectrum to a spot beam. The payload 700 in this example includes an IF down-converter 702 into which both the received regional beam RU01 and received spot beam U01 are fed. The downcoverted IF is then converted to digital and channelized by the ADC 704 and digital channelizer 706, respectively. Once digitized, the frequency spectrum of the two beams may be reallocated through IF routing. Since regional beam RD01 is downlinked to a dedicated band, it will not interfere with the rest of the 4-color reused spot beams.

The payload 700 includes a conventional output path to the regional beam downlink antenna 708, including an LTWTA 710 and a bandpass filter 712 that passes the 500 MHz of regional beam spectrum in accordance with the frequency plan. However, the output path to a downlink spot beam antenna 714 for D01 includes a diplexer 716 to split the output analog spot beam, which is then passed through a pair of channel bandpass filters: channel A 718 and channel B 720. The channel B bandpass filter 720 is the normal spot beam bandpass filter corresponding to the allocated frequency slot for spot beam D01. The channel A bandpass filter 718 passes the shareable portion of the regional beam spectrum. The filtered signals are then recombined by a second diplexer 722 and sent to the downlink spot beam antenna 714.

The digital channelizer 706 dynamically reallocates a portion, or all, of the shareable regional beam spectrum from the regional beam to the spot beam if the regional beam does not require the spectrum and traffic demand in the area of the spot beam requires additional spectrum.

Figure 15:
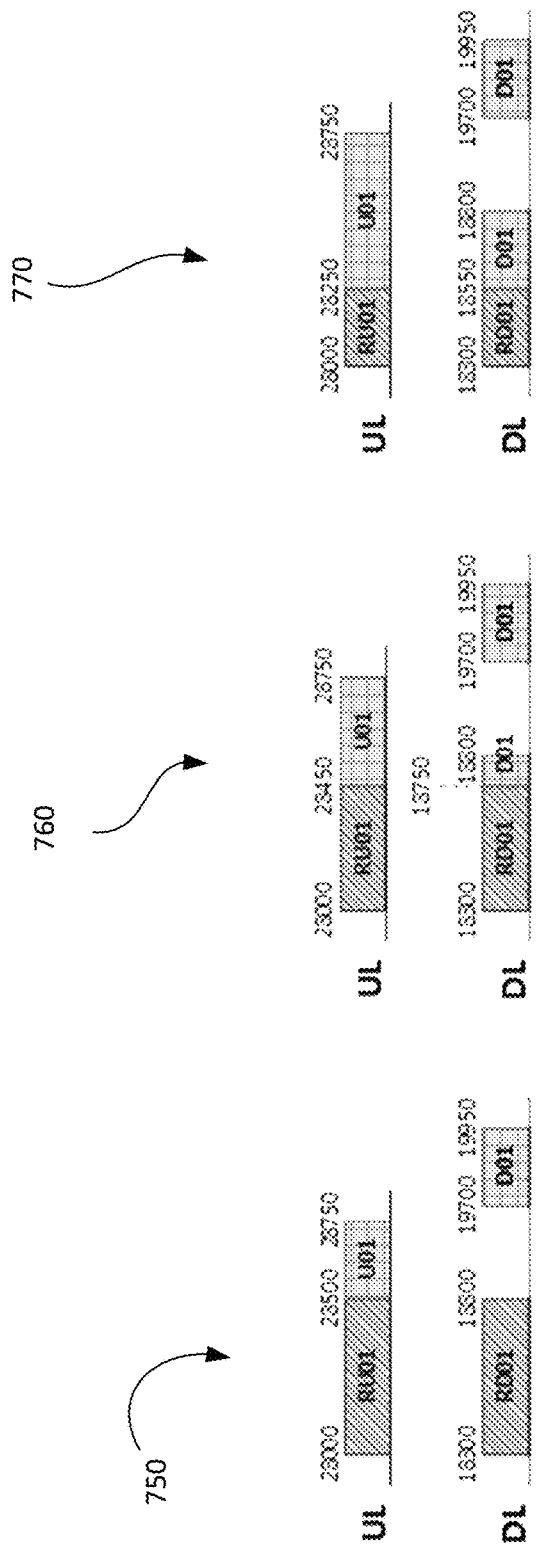
FIG. 15 shows example uplink and downlink frequency plans with different reallocations.

Reference is now made to FIG. 15, which shows example frequency plan diagrams to illustrate the dynamic reallocation of spectrum in the example payload 700. In this example, a first frequency plan diagram 750 shows the spectrum without reallocation. The uplink spectrum allocated to the regional beam is 500 MHz between 28 GHz and 28.5 GHz. The downlink spectrum for the regional beam is 500 MHz between 18.3 GHz and 18.8 GHz. The uplink spot beam uses 250 MHz between 28.5 GHz and 28.75 GHz, and the downlink spot beam uses 250 MHz between 19.7 GHz and 19.95 GHz.

A second frequency plan diagram 760 illustrates the situation when 50 MHz of the regional beam spectrum is reallocated for use by the spot beam. In this example, it will be noted that the uplink spectrum for the regional beam is now 450 MHz, spanning 28 GHz to 28.45 GHz, whereas the uplink spectrum for the spot beam is now 300 MHz spanning 28.45 GHz to 28.75 GHz. Similarly, the downlink for the regional beam has 450 MHz between 18.3 GHz and 18.75 GHz. The downlink for the spot beam now uses 50 MHz from 18.75 GHz and 18.8 GHz plus its usual spectrum from 19.7 GHz to 19.95 GHz.

A third example frequency plan diagram 770 shows full reallocation of the shareable regional beam spectrum to the spot beam. In this example, the regional beam now occupies only 250 MHz of the uplink and downlink spectrum, and its shareable spectrum is now fully allocated to the spot beam.

In the above example shown in FIG. 14, only one spot beam, U01/D01, is configured to use the shareable spectrum from the regional beam. However, it will be understood that some, or all, of other spot beams (U02/D02, U12/D12) may be configured so as to be capable of sharing the reallocatable spectrum from the regional beam if the those spot beams are also routed through the digital channelizer 706.

Advantageously, the digital channelizer 706 is able to reallocate fractions of the available sharable bandwidth from the regional beam to one or more of the spot beams as traffic demand changes.

The above example, illustrates the dynamic reallocation of a portion of the regional beam spectrum to a spot beam. In another aspect, uplink spectrum may be shared between a regional beam and a spot beam.

Figure 16:
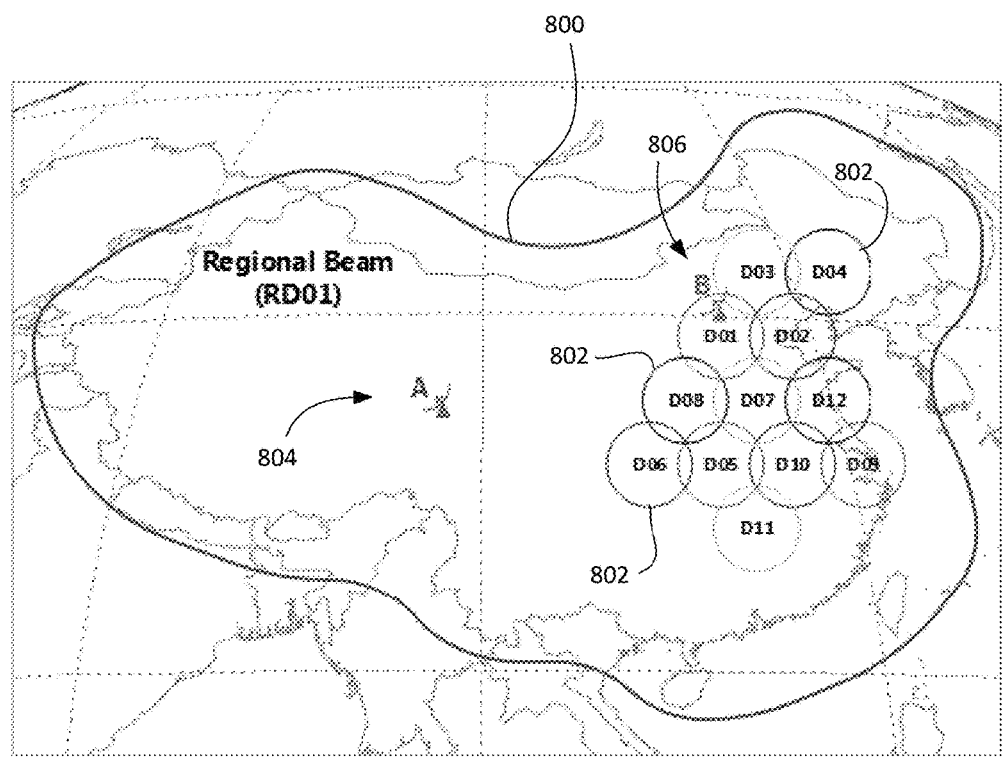
FIG. 16 diagrammatically shows coverage areas of a regional beam and spot beams with spatially distinct uplink locations.
Figure 17:
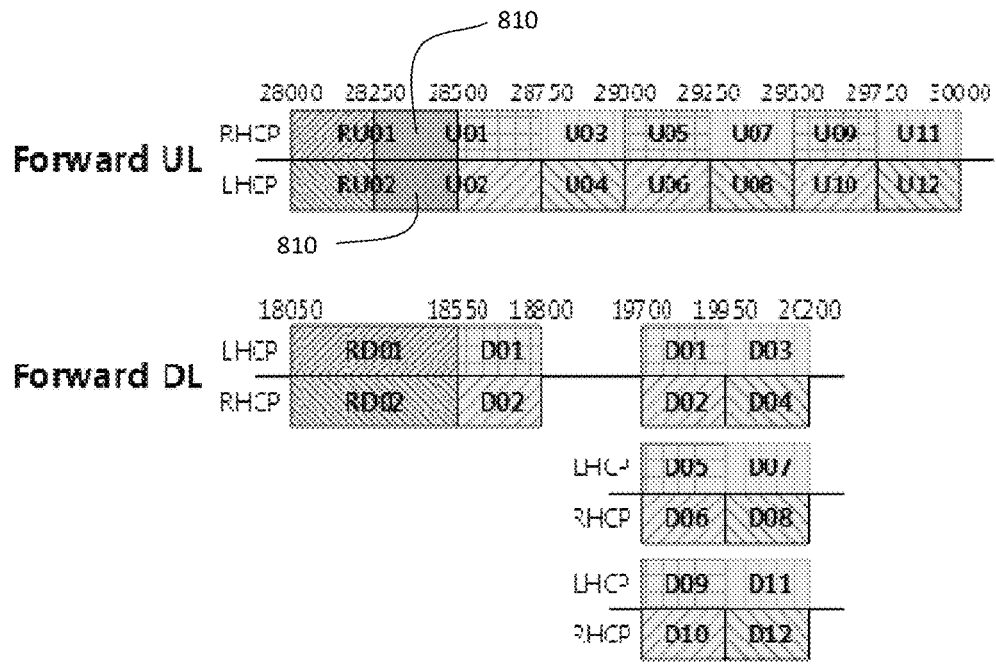
FIG. 17 shows example uplink and downlink frequency plans using shared regional beam spectrum.
Figure 18:
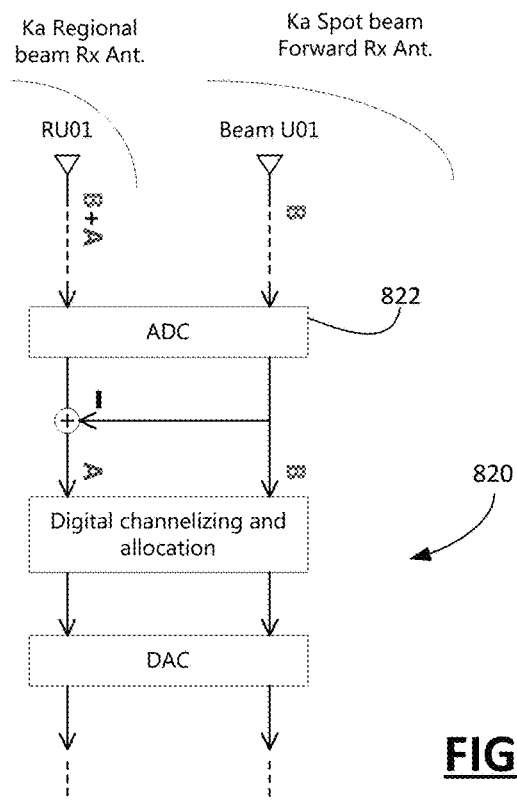
FIG. 18 shows an example portion of a payload with digital cancellation for realizing shared regional beam spectrum.

Reference will now be made to FIGS. 16, 17 and 18 to illustrate an example implementation of sharing uplink frequency spectrum between a regional beam and a spot beam. FIG. 16 shows an example of a regional beam coverage area 800 and coverage areas 802 for various spot beams within the regional beam coverage area 800. FIG. 16 shows an uplink location 806 for the spot beam U01/D01. It will also be noted that the uplink location 804 for the regional beam is outside of the spot beam U01/D01 coverage area 802. In this example, the regional beam uplink location 804 happens to be outside the location of all spot beam coverage areas 802, but it is not necessarily case in other embodiments.

FIG. 17 shows diagrams for the uplink and downlink frequency plans. In this example, the uplink for the regional beam spans from 28 GHz to 28.5 GHz, and the uplink for the spot beams U01 and U02 span 28.25 GHz to 28.75 GHz. In other words, the allocated uplink spectrum for the regional beam and one or more spot beams overlaps. The block of spectrum denoted by reference numeral 810 is "shared" spectrum, i.e. it may be used by both the regional beam uplink and spot beam uplink at the same time.

FIG. 18 shows a portion of an example payload 820 for sharing uplink spectrum between a regional beam and a spot beam. In this example, the payload 820 uses digital cancellation to separate the two signals. As illustrated, the regional beam antenna will receive signals from both the regional beam uplink location 804 and the spot beam uplink location 806. Thus, the signals in the shared spectrum 810 will cause interference with each other. The spot beam antenna, having a narrow beamwidth that excludes the regional beam uplink location 804, will only receive the spot beam uplink signal. Accordingly, both received signals are digitized by ADC 822 and the spot beam uplink signal is then digitally subtracted from the signal received by the regional beam antenna, which removes the interfering spot beam signal and leaves the regional beam signal.

Although the above example uses the Ka band for illustration, it will be understood that the same uplink sharing through digital cancellation may be applied to the C band or Ku band in other examples.

Example embodiments of the present disclosure are not limited to any particular type of satellite or antenna.

The various embodiments presented above are merely examples and are in no way meant to limit the scope of this application. Variations of the innovations described herein will be apparent to persons of ordinary skill in the art, such variations being within the intended scope of the present application. Additionally, the subject matter described herein and in the recited claims intends to cover and embrace all suitable changes in technology.

The invention claimed is:

1. A satellite payload for satellite communications, the payload comprising:
a regional beam antenna operable over a regional band of spectrum, wherein the regional band of spectrum includes a first frequency band and a first polarization;
a narrowband spot beam antenna operable over both (1) a spot beam band of spectrum having different frequencies from the regional band of spectrum, and (2) a portion of the regional band of spectrum wherein the portion includes the first frequency band and the first polarization;
a digital channelizer to route digitized spot beam channels to downlink channels, and wherein the digital channelizer is to dynamically assign one or more digitized spot beam channels to a part of the portion of the regional band of spectrum for downlink transmission by the narrowband spot beam antenna;
a digital-to-analog converter to convert the digitized spot beam channels to analog;
an RF up-converter to up-convert the analog spot beam channels; and
a spot beam spectrum amplifier to amplify the up-converted analog spot beam channels in the spot beam band of spectrum and the portion of the regional band of spectrum,
wherein spectrum includes both frequency and polarization.

2. The satellite payload of claim 1, further comprising a first diplexer to separate the amplified up-converted analog spot beam channels into the portion of the regional band of spectrum and the spot beam band, a first bandpass filter for the portion of the regional band of spectrum, a second bandpass filter for the spot beam band, and a second diplexer to combine filtered amplified up-converted analog spot beam channels for output to the narrowband spot beam antenna.

3. The satellite payload of claim 1, wherein the digital channelizer is to route digitized spot beam channels to the portion of the regional band of spectrum based upon excess demand in a coverage area for the spot beam and based on a determination that there is available capacity in the portion of the regional band of spectrum.

4. The satellite payload of claim 1, wherein the RF up-converter further up-converts regional beam channels in a remaining portion of the regional band of spectrum that excludes the portion of the regional band of spectrum, and further comprising a regional beam amplifier for amplifying the regional band of spectrum including the regional band channels and transmitting the amplified regional beam via the regional beam antenna.

5. The satellite payload of claim 1, wherein the digital channelizer is to assign said one or more digitized spot beam channels to said part of the portion of the regional band of spectrum based on a determination that the regional band of spectrum has excess capacity and that the capacity of the spot beam spectrum is fully engaged.

6. The satellite payload of claim 1, further comprising a plurality of narrowband spot beam antennas each operable over respective spot beam bands of spectrum different from each other, and each operable over the portion of the regional band of spectrum.

7. The satellite payload of claim 6, wherein the digital channelizer is to route at least one digitized spot beam channel from a first spot beam band of spectrum to a first channel in the portion of the regional band of spectrum, and to route at least one digitized spot beam channel from a second spot beam band of spectrum to a second channel in the portion of the regional band of spectrum.

8. The satellite payload claimed in claim 1, wherein the regional beam antenna is operable using left-hand circular polarization and right-hand circular polarization, and the narrowband spot beam antenna is operable using one of left-hand circular polarization and right-hand circular polarization.

9. The satellite payload claimed in claim 1, wherein both the regional beam antenna and the spot beam antenna are operable using the first polarization, and the first polarization is either left-hand circular polarization or right-hand circular polarization.

10. A method of dynamic spectrum reallocation in a satellite, the method comprising:
providing a regional beam antenna operable over a regional band of spectrum, wherein the regional band of spectrum includes a first frequency band and a first polarization, and wherein the regional beam antenna receives one or more regional beam channels;
providing a narrowband spot beam antenna operable over both (1) a spot beam band of spectrum having different frequencies from the regional band of spectrum, and (2) a portion of the regional band of spectrum wherein the portion includes the first frequency band and the first polarization, and wherein the spot beam antenna receives a plurality of spot beam channels;
digitally channelizing the plurality of spot beam channels to downlink channels, including dynamically assigning one or more digitized spot beam channels to a part of the portion of the regional band of spectrum;
converting the digitized spot beam channels to analog;
up-converting the analog spot beam channels;
amplifying the up-converted analog spot beam channels in the spot beam band of spectrum and the portion of the regional band of spectrum; and
transmitting the amplified spot beam band of spectrum and portion of the regional band of spectrum via the narrowband spot beam antenna,
wherein spectrum includes both frequency and polarization.

11. The method of claim 10, further comprising separating the amplified up-converted analog spot beam channels into the portion of the regional band of spectrum and the spot beam band, bandpass filtering the portion of the regional band of spectrum, bandpass filtering the spot beam band, and combining filtered amplified up-converted analog spot beam channels for output to the narrowband spot beam antenna.

12. The method claimed in claim 11, wherein the separating uses a first diplexer, and wherein the combining uses a second diplexer.

13. The method claimed in claim 10, further comprising determining available capacity in the portion of the regional band of spectrum, and routing the digitized spot beam channels to the portion of the regional band of spectrum based upon excess demand in a coverage area for the spot beam and the available capacity.

14. The method claimed in claim 10, wherein up-converting includes up-converting the regional beam channels in a remaining portion of the regional band of spectrum that excludes the portion of the regional band of spectrum, amplifying the regional band of spectrum including the regional band channels, and transmitting the amplified regional beam via the regional beam antenna.

15. The method claimed in claim 10, further comprising determining that the regional band of spectrum has excess capacity and that the capacity of the spot beam spectrum is fully engaged and, on that basis, assigning said one or more digitized spot beam channels to said part of the portion of the regional band of spectrum.

16. The method claimed in claim 10, wherein the satellite includes a plurality of narrowband spot beam antennas each operable over respective spot beam bands of spectrum different from each other, and each operable over the portion of the regional band of spectrum.

17. The method claimed in claim 16, further comprising routing at least one digitized spot beam channel from a first spot beam band of spectrum to a first channel in the portion of the regional band of spectrum, and routing at least one digitized spot beam channel from a second spot beam band of spectrum to a second channel in the portion of the regional band of spectrum.

18. The method claimed in claim 10, wherein the regional beam antenna is operable using left-hand circular polarization and right-hand circular polarization, and the narrowband spot beam antenna is operable using one of left-hand circular polarization and right-hand circular polarization.

19. The method claimed in claim 10, wherein both the regional beam antenna and the spot beam antenna are operable using the first polarization, and the first polarization is either left-hand circular polarization or right-hand circular polarization.

20. A satellite payload for satellite communications, the payload comprising:
a regional beam antenna operable over a regional band of spectrum;
a narrowband spot beam antenna operable over a spot beam band of spectrum and a portion of the regional band of spectrum;
a digital channelizer to route digitized spot beam channels to downlink channels, and wherein the digital channelizer is to dynamically assign one or more digitized spot beam channels to a part of the portion of the regional band of spectrum;
a digital-to-analog converter to convert the digitized spot beam channels to analog;
an RF up-converter to up-convert the analog spot beam channels;
a spot beam spectrum amplifier to amplify the up-converted analog spot beam channels in the spot beam band of spectrum and the portion of the regional band of spectrum;

a first diplexer to separate the amplified up-converted analog spot beam channels into the portion of the regional band of spectrum and the spot beam band;
a first bandpass filter for the portion of the regional band of spectrum;
a second bandpass filter for the spot beam band; and
a second diplexer to combine filtered amplified up-converted analog spot beam channels for output to the narrowband spot beam antenna.

* * * * *